(12) United States Patent
Haneda

(10) Patent No.: US 6,498,910 B2
(45) Date of Patent: Dec. 24, 2002

(54) IMAGE FORMING WITH LIGHT AND DARK HUE TONERS

(75) Inventor: Satoshi Haneda, Toyko (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/824,260

(22) Filed: Apr. 2, 2001

(65) Prior Publication Data

US 2001/0028805 A1 Oct. 11, 2001

(30) Foreign Application Priority Data

| Apr. 7, 2000 | (JP) | 2000-106227 |
| May 10, 2000 | (JP) | 2000-137089 |
| Aug. 2, 2000 | (JP) | 2000-234406 |
| Sep. 19, 2000 | (JP) | 2000-283449 |

(51) Int. Cl.[7] .................... G03G 15/043; G03G 15/01
(52) U.S. Cl. ............................. 399/51; 399/302
(58) Field of Search ...................... 399/51, 302, 308

(56) References Cited

U.S. PATENT DOCUMENTS

| 4,961,094 A | * | 10/1990 | Yamaoki et al. | 399/232 |
| 5,162,860 A | * | 11/1992 | Nami et al. | 358/501 |
| 5,347,345 A | * | 9/1994 | Osterhoudt | 399/231 X |
| 5,761,573 A | * | 6/1998 | Haneda et al. | 399/66 |
| 5,862,434 A | * | 1/1999 | Yamakawa | 399/302 X |
| 5,985,499 A | * | 11/1999 | Guth et al. | 399/231 X |
| 6,013,403 A | * | 1/2000 | Ichikawa | 399/49 X |

FOREIGN PATENT DOCUMENTS

JP 58-162970 * 9/1983

* cited by examiner

*Primary Examiner*—Fred L Braun
(74) *Attorney, Agent, or Firm*—Frishauf, Holtz, Goodman & Chick, P.C.

(57) ABSTRACT

An image forming apparatus that forms a toner image. First and second image data is generated independently to produce a light and/or dark colored latent image. Thereafter, the latent image formed on an image forming body through charging and image-wise exposure is developed by using light and/or dark colored toner of the same color. Furthermore, there is a difference of an average amount of electrostatic charges between the dark colored toner and the light colored toner within 25%.

18 Claims, 23 Drawing Sheets

FIG. 18
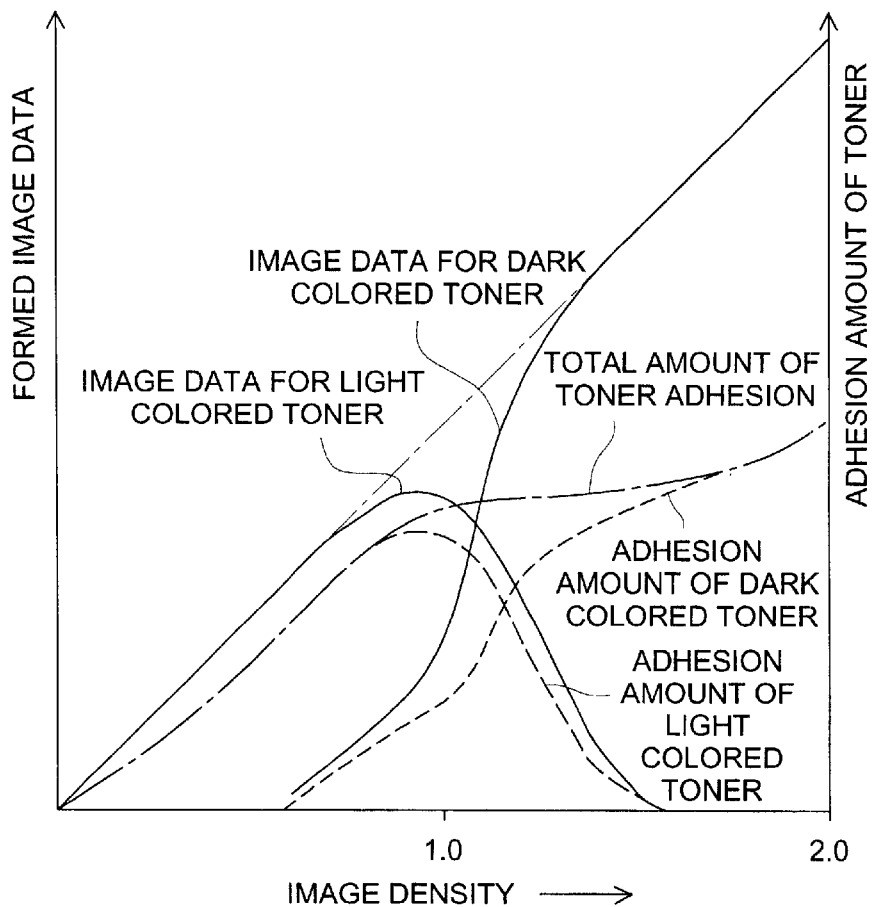
FIG. 19 (a)  FIG. 19 (b)  FIG. 19 (c)
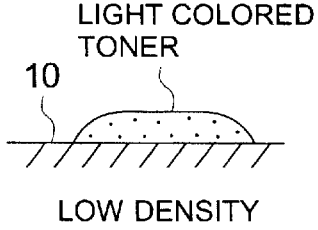
LOW DENSITY
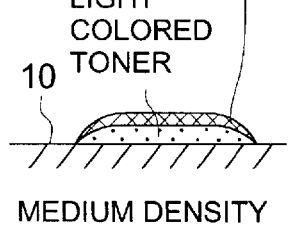
MEDIUM DENSITY
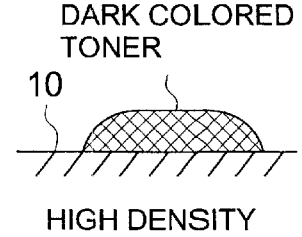
HIGH DENSITY

LOW DENSITY

MEDIUM DENSITY

HIGH DENSITY

IMAGE FORMING WITH LIGHT AND DARK HUE TONERS

BACKGROUND OF THE INVENTION

The present invention relates to an image forming apparatus for conducting image forming by the use of toner in an electrophotographic method, and in particular, to an image forming apparatus and a color image forming apparatus for conducting image forming by developing with two toner types represented by light colored toner and dark colored toner both in the similar color hue.

In an image forming apparatus employing an electrophotographic method, uniform charging is conducted by a charging means on an image forming body which is then subjected to image-wise exposure so that a latent image is formed. The latent image section is then subjected to reversal development by the succeeding developing means, and a toner image is formed. In an image forming apparatus of a digital mode, image-wise exposure is made by dots modulated in terms of a pulse width, for example, and there is conducted reversal development wherein toner is stuck to a section of dots. An amount of toner adhering to the section of dots is determined depending on an area of a dot section on an image forming body, a state of potential, a developing bias for the state of potential and a state of electric charges on toner.

With regard to a section of a high density image recorded by an image exposure means on an image forming body, the number of dots per a unit of area is large, a size of one dot is great, and electric potential falls greatly. On the other hand, With regard to a section of a high density image recorded by an image exposure means on an image forming body, the number of dots per unit area is large, a size of one dot is great, and electric potential falls greatly. With regard to a section of a low density image, on the other hand, the number of dots per unit area is small, a size of one dot is small, and electric potential falls less. Owing to the foregoing, a toner adhesion amount on the section of a high density image on the image forming body after development is large and a toner adhesion amount on the section of a low density image is small. A difference between high image density and low image density on a recorded image is represented by whether the amount of tone per unit area adhering to the image forming body after development is large or small.

However, it is difficult for toner of a single type to form images with excellent gradation. On the highlight section (low density part), in particular, adhesion of toner in extremely small amount per unit area is unstable because of a small size of a dot, thus, image unevenness tends to be caused easily and it is difficult to obtain stable gradation. On the high density part, toner is in the excessive toner adhesion, and image density tends to be saturated, and gradation in a broad area is not obtained. Even if dark colored toner and light colored toner are simply used, a medium density part turns out to be discontinuous or unstable.

SUMMARY OF THE INVENTION

The invention is represented by an image forming apparatus that performs development by using two toner types of light colored toner and dark colored toner in the similar color (for example, either one of cyan (C), magenta (m), yellow (Y) and black (K)), and is applied to a monochromatic image forming apparatus and a color image forming apparatus. Further, the invention is represented by an image forming apparatus wherein reversal development by dark colored toner and reversal development by light colored toner are conducted for one image-wise exposure so that smooth gradation may be obtained without a formation of deviation between a light colored toner image and a dark colored toner image, and thereby image forming is carried out by using dark colored toner and light colored toner.

(1) In the apparatus stated above, the first object of the invention is to provide a monochromatic image forming apparatus employing dark colored toner and light colored toner, wherein there is stipulated characteristic relationship between dark colored toner and light colored toner which can maintain gradation and can obtain stably excellent images.

(2) In the apparatus stated above, the second object of the invention is to provide a color image forming apparatus employing dark colored toner and light colored toner for 4 colors of Y, M, C and K, wherein there is stipulated characteristic relationship between dark colored toner and light colored toner which holds color reproducibility, maintains gradation and can obtain stably excellent color images.

(3) In the apparatus stated above, the third object of the invention is to provide a color image forming apparatus employs transparent toner and white toner in addition to dark colored toner and light colored toner for 4 colors of Y, M, C and K and is capable of obtaining images with higher image quality, wherein there is stipulated characteristic relationship for light colored toner, transparent toner and white toner which makes it possible to obtain excellent color images.

Further, the invention is represented by an image forming apparatus that performs development by using two toner types of light colored toner and dark colored toner in the similar color (for example, either one of cyan (C), magenta (M), yellow (Y) and black (K)), and is applied to a monochromatic image forming apparatus and a color image forming apparatus. Further, the invention is represented by an image forming apparatus wherein reversal development by dark colored toner and reversal development by light colored toner are conducted for one image-wise exposure so that smooth gradation may be obtained without a formation of deviation between a light colored toner image and a dark colored toner image, and thereby image forming is carried out by using dark colored toner and light colored toner.

(4) In the apparatus stated above, the fourth object of the invention is to provide an image forming apparatus wherein stability of gradation on a highlight portion and improvement of gradation on a high density part are attained by combining processing of image density data and usage of image data for light colored toner and dark colored toner.

(5) In the apparatus stated above, the fifth object of the invention is to provide an image forming apparatus wherein there is provided the most desirable relationship in terms of recorded density between light colored toner and dark colored toner that heightens the effect when forming images with excellent gradation by using light colored toner and dark colored toner.

(6) When forming color images by using light colored toner and dark colored toner, it is necessary to provide developing means respectively for 4 colors of Y, M, C and K each housing therein light colored toner and dark colored toner, resulting in 8 sets of developing units provided to face an image forming body. There may be an image forming apparatus wherein 8 sets of developing units are provided to face an image forming body, and toner images respectively for 4 colors and respectively for light colored toner and dark colored toner are superimposed on an image forming body for image forming, or an image forming apparatus wherein 8 sets of developing units are provided to face respectively 8 image forming bodies, and one toner image for one color for light colored toner and dark colored toner is formed on each image forming body to be superimposed on a transfer sheet. In the apparatus stated above, the sixth object of the invention is to provide an image forming apparatus wherein the size is smaller than that of the aforesaid image forming apparatus and colors can be superposed easily.

(7) In the apparatus stated above, the seventh object of the invention is to provide an image forming apparatus wherein a reproduction area is broadened by using light colored toner and dark colored toner, and further, image quality is improved by reducing splash of dark colored toner on a highlight section which easily stands out conspicuous.

Further, the invention is represented by an image forming apparatus that performs development by using two toner types of light colored toner and dark colored toner in the similar color (for example, either one of cyan (C), magenta (M), yellow (Y) and black (K)), and is applied to a monochromatic image forming apparatus and a color image forming apparatus.

(8) In the apparatus stated above, the eighth object of the invention is to provide a small-sized image forming apparatus wherein light colored toner and dark colored toner are used depending on images, by combining processing of image density data and usage of image data for light colored toner and dark colored toner, and an image forming apparatus wherein images can be changed depending on purposes for a glossy image, a non-glossy image and an image of OHP.

(9) In the apparatus stated above, the ninth object of the invention is to provide an image forming apparatus wherein continuity of image quality from a low density part to a high density part and continuity of flatness are maintained and excellent properties for transfer can be obtained, by combining processing of image density data and usage of image data for light colored toner and dark colored toner.

(10) In the apparatus stated above, the tenth object of the invention is to provide an image forming apparatus wherein suitable for a color printing apparatus which employs light colored toner and dark colored toner and is especially small in size, and an image forming apparatus that is suitable for selection of how to use light colored toner and dark colored toner depending on images, namely, for example, suitable for selected usage of dark colored toner only for a business documentation.

(11) The eleventh object of the invention is represented by an image forming apparatus that performs development by using two toner types of light colored toner and dark colored toner in the similar color (for example, either one of cyan (C), magenta (M), yellow (Y) and black (K)), and is applied to a monochromatic image forming apparatus and a color image forming apparatus. In the apparatus stated above, the eleventh object of the invention is to provide an image forming apparatus wherein there is formed an image in which both high resolving power and high gradation can be obtained.

The first object of the invention is attained by either one of the following Structures (1)–(3).

(1) An image forming apparatus that forms a toner image by conducting development of a latent image formed on an image forming body through charging and image-wise exposure by using dark colored toner and development of the latent image by using light colored toner, wherein a difference of an average amount of electrostatic charges between dark colored toner and light colored toner is within 25%.

(2) An image forming apparatus that forms a toner image by conducting development of a latent image formed on an image forming body through charging and image-wise exposure by using dark colored toner and development of the latent image by using light colored toner, wherein a difference of a toner particle size in terms of weight average particle size between dark colored toner and light colored toner is within 25%.

(3) An image forming apparatus that forms a toner image by conducting development of a latent image formed on an image forming body through charging and image-wise exposure by using dark colored toner and development of the latent image by using light colored toner, wherein a difference of an amount of toner adhering to a latent image section in the same potential contrast between dark colored toner and light colored toner is within 25%.

The second object of the invention is attained by either one of the following Structures (4)–(6).

(4) A color image forming apparatus that superposes and transfers, onto a transfer material, a plurality of toner images each being formed on each of plural image forming bodies by conducting development with dark colored toner and development with light colored toner, wherein a difference of an average amount of electrostatic charges among plural color toners is within 25% in all cases.

(5) A color image forming apparatus that superposes and transfers, onto a transfer material, a plurality of toner images each being formed on each of plural image forming bodies by conducting development with dark colored toner and development with light colored toner, wherein a difference of a toner particle size in terms of weight average particle size among plural color toners is within 25% in all cases.

(6) A color image forming apparatus that superposes and transfers, onto a transfer material, a plurality of toner images each being formed on each of plural image forming bodies by conducting development with dark colored toner and development with light colored toner, wherein a difference of an average amount of electrostatic charges among plural color toners is within 25%, and a difference of a toner particle size in terms of weight average particle size among plural color toners is within 25% in all cases.

The third object of the invention is attained by either one of the following Structures (7)–(9).

(7) A color image forming apparatus that conducts development with transparent toner and development with white toner by conducting development with dark colored toner and development with light colored toner for each color for each of plural image forming bodies and thereby superposes the formed toner image on a transfer material for forming, wherein a difference of an average amount of electrostatic charges among each color toner, transparent toner and white toner is within 25% in all cases.

(8) A color image forming apparatus that conducts development with transparent toner and development with white toner by conducting development with dark colored toner and development with light colored toner for each color for each of plural image forming bodies and thereby superposes the formed toner image on a transfer material for forming, wherein a difference of a particle size in terms of weight average particle size among each color toner, transparent toner and white toner is within 25% in all cases.

(9) A color image forming apparatus that conducts development with transparent toner and development with white toner by conducting development with dark colored toner and development with light colored toner for each color for each of plural image forming bodies and thereby superposes the formed toner image on a transfer material for forming, wherein a difference of an average amount of electrostatic charges among each color toner, transparent toner and white toner is within 25% in all cases.

The fourth object of the invention is attained by following Structure (10).

(10) An image forming apparatus that conducts development with light colored toner and development with dark colored toner, based on image data, wherein image data for light colored toner and that for dark colored toner are generated from image density data, and each image-wise exposure is conducted after gradation correction is conducted for each image data.

The fifth object of the invention is attained by following Structure (11).

(11) An image forming apparatus that conducts development with light colored toner and development with dark colored toner, based on image data, wherein a gradient ratio of recording density for light colored toner and dark colored toner is within a range of 0.2–0.5.

The sixth object of the invention is attained by following Structure (12).

(12) An image forming apparatus that conducts development with light colored toner and development with dark colored toner, based on image data, wherein a light colored toner image and a dark colored toner image are superposed on an image forming body through repetition of charging, image-wise exposure and development.

The seventh object of the invention is attained by either one of following Structures (13) and (14).

(13) An image forming apparatus that forms toner images on an image forming body by using light colored toner and dark colored toner, then, transfers and superposes the images on a transfer body, and transfers collectively on a transfer material, wherein a light colored toner image is formed before a dark colored toner image is formed.

(14) An image forming apparatus that forms toner images on an image forming body by using light colored toner and dark colored toner, and transfers and superposes the images on a transfer material, wherein a light colored toner image is formed before a dark colored toner image is formed.

The eighth object of the invention is attained by either one of following Structures (15) and (16).

(15) An image forming apparatus conducting image-wise exposure and development with light colored toner and image-wise exposure and development with dark colored toner, based on image data, wherein a means for dividing image density data into image data for light colored toner and that for dark colored toner makes image data change that changes a rate of usage for light colored toner and dark colored toner.

(16) An image forming apparatus conducting image-wise exposure and development with light colored toner and image-wise exposure and development with dark colored toner, based on image data, wherein an image data change that changes glossiness of outputted image is made by a means that divides image density data into image data for light colored toner and that for dark colored toner by using light colored toner whose glossiness is higher than that of dark colored toner.

The ninth object of the invention is attained by either one of following Structures (17), (18) and (19).

(17) An image forming apparatus conducting image-wise exposure and development with light colored toner and image-wise exposure and development with dark colored toner, based on image data, wherein a means for dividing image density data into image data for light colored toner and that for dark colored toner has image data for light colored toner at a high density part.

(18) An image forming apparatus conducting image-wise exposure and development with light colored toner and image-wise exposure and development with dark colored toner based on image data and transferring the light colored toner and the dark colored toner onto a transfer material, wherein a layer of light colored toner is positioned to be over a layer of dark colored toner on a transfer material.

(19) An image forming apparatus conducting image-wise exposure and development with light colored toner and image-wise exposure and development with dark colored toner based on image data and transferring the light colored toner and the dark colored toner onto a transfer material, wherein glossiness of light colored toner is made to be higher than that of dark colored toner, and image data for light colored toner are provided even on a high density part.

The tenth object of the invention is attained by either one of following Structures (20) and (21).

(20) An image forming apparatus conducting image-wise exposure and development with light colored toner and image-wise exposure and development with dark colored toner, based on image data, wherein a light colored toner image and a dark colored toner image are superposed for image forming on an image forming body through repetition of charging, image-wise exposure and development on an image forming body.

(21) An image forming apparatus conducting image-wise exposure and development with light colored toner and image-wise exposure and development with dark colored toner, based on image data, wherein a light colored toner image and a dark colored toner image are formed on each of two image forming bodies through charging, image-wise exposure and development, and a light colored toner image and a dark colored toner image are superposed.

The eleventh object of the invention is attained by following Structures (22).

(22) An image forming apparatus that is equipped with developing units employing respectively dark and light colored toners in the similar color provided around an image forming body, and conducts development for superposing a dark colored toner image and a light colored toner image, so that the superposed dark colored toner image and light colored toner image are transferred onto a transfer material, wherein an image forming cycle for dark colored toner is made smaller than that for light colored toner.

Incidentally, the image forming cycle stated above is a cycle formed by a dither processing or a pulse width modulation processing.

Figure 3:
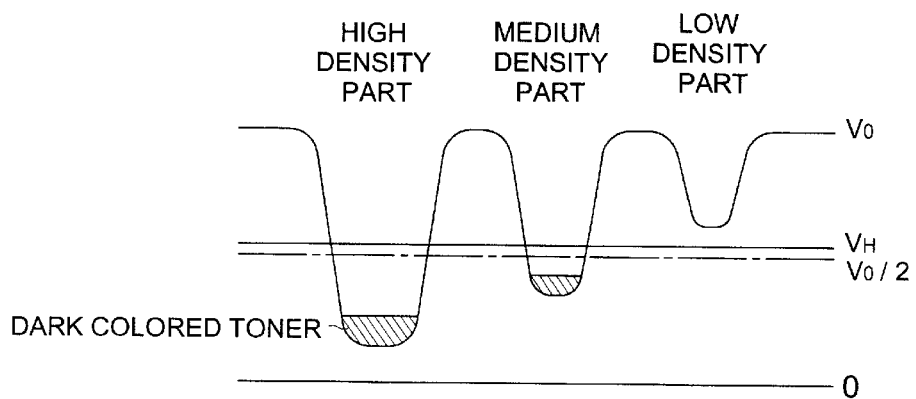
Figure 3:
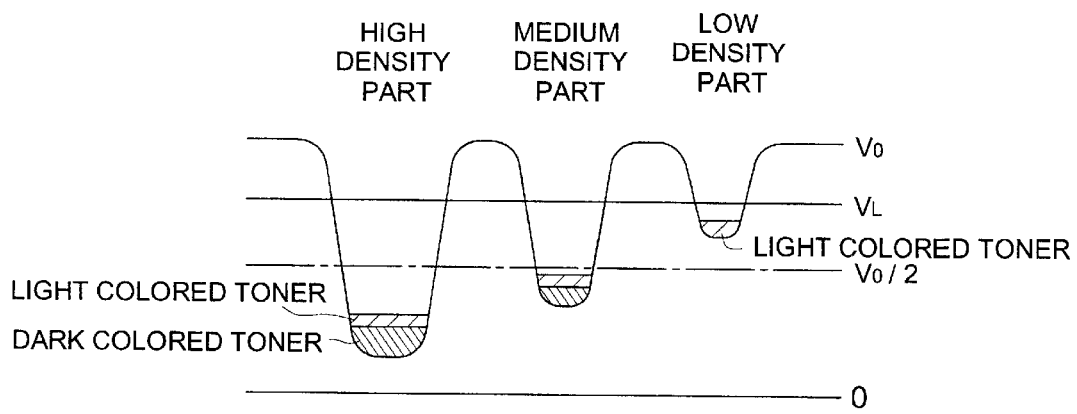

Each of FIGS. 3($a$) and 3($b$) is an illustration showing how toner is sticking to a latent image section.

Figure 4:
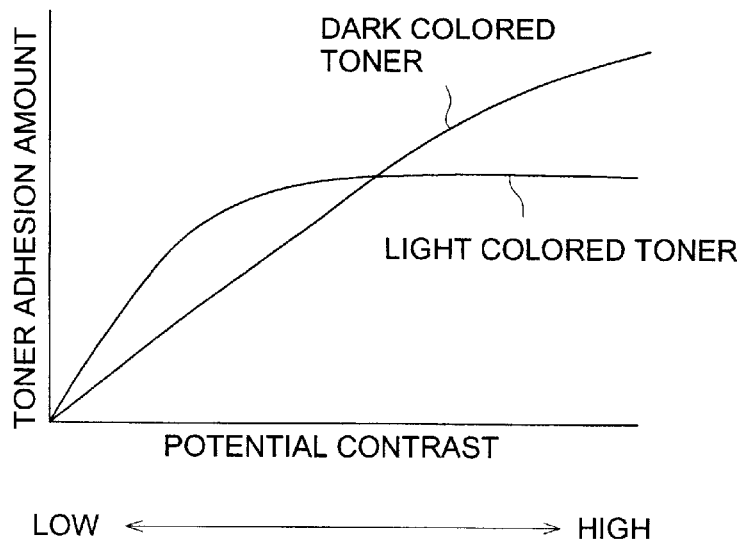

FIG. 4 is a graph showing relationship between potential contrast and a toner adhesion amount.

Figure 5:
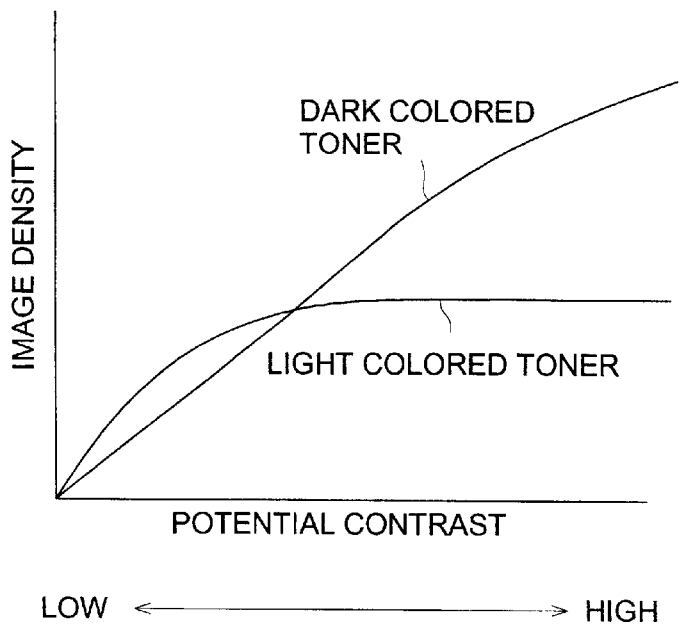

FIG. 5 is a graph showing relationship between potential contrast and image density.

Figure 6:
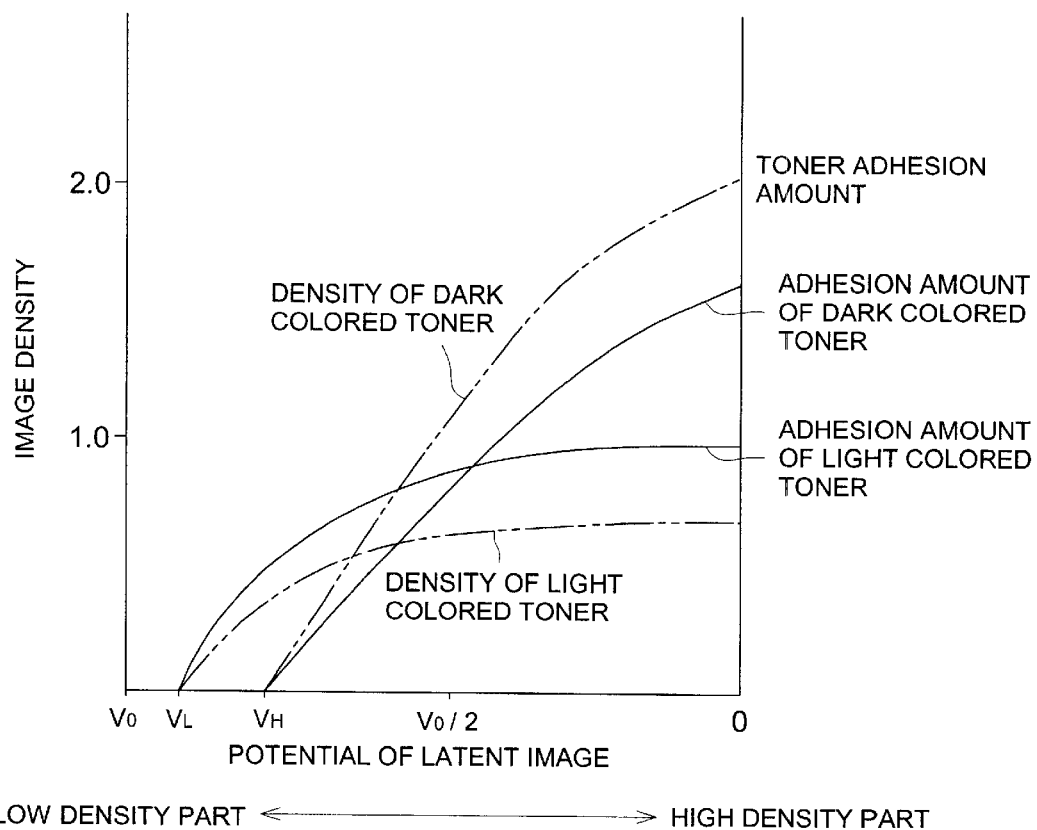

FIG. 6 is a graph showing relationship between potential of a latent image plus image density and a toner adhesion amount.

Figure 7:
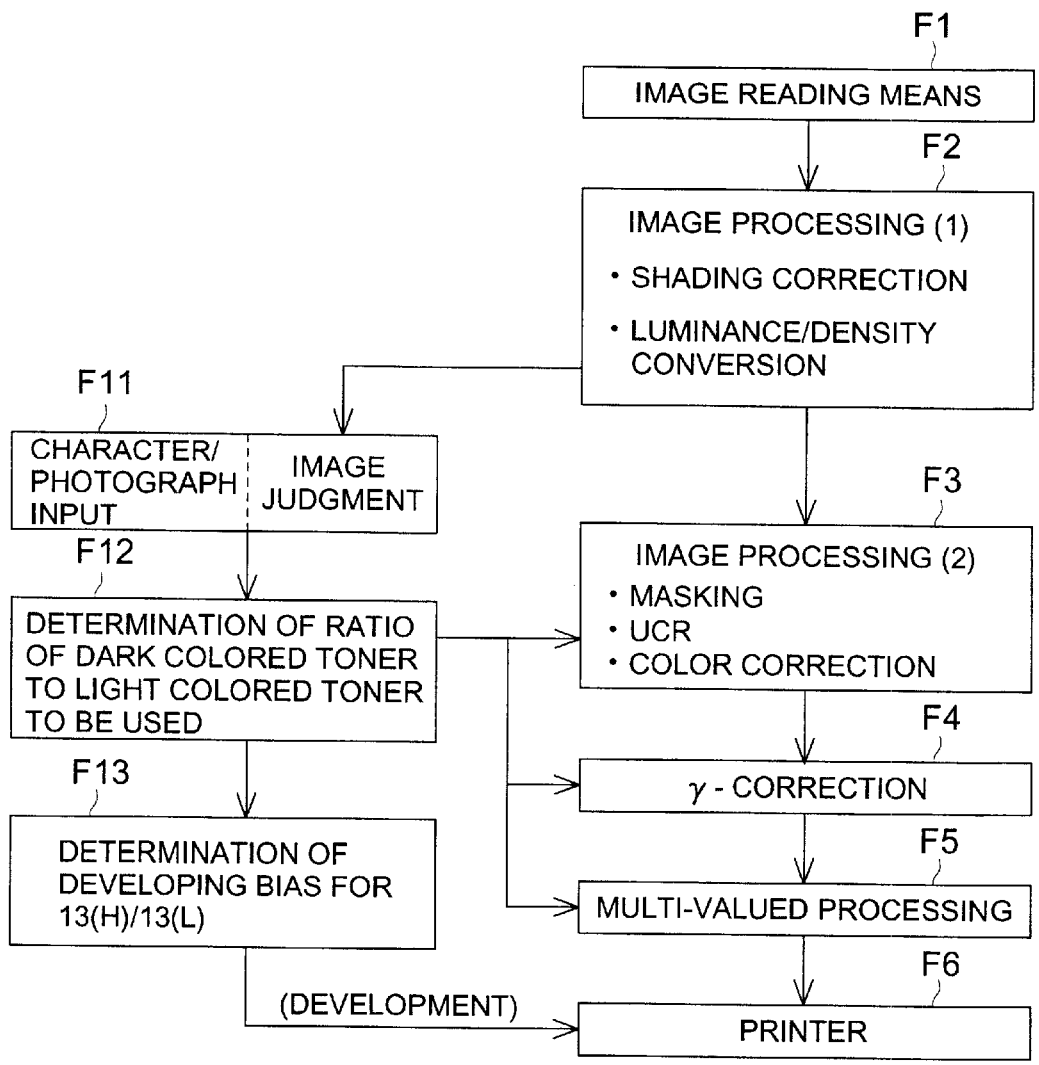

FIG. 7 is a block diagram of an image processing system.

Figure 8:
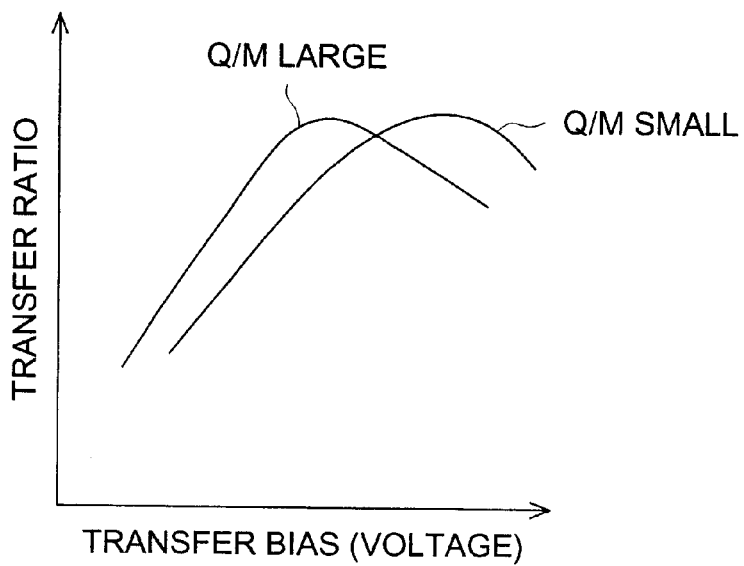

FIG. 8 is a graph showing relationship between an amount of electrostatic charges and transfer ratio.

Figure 9:
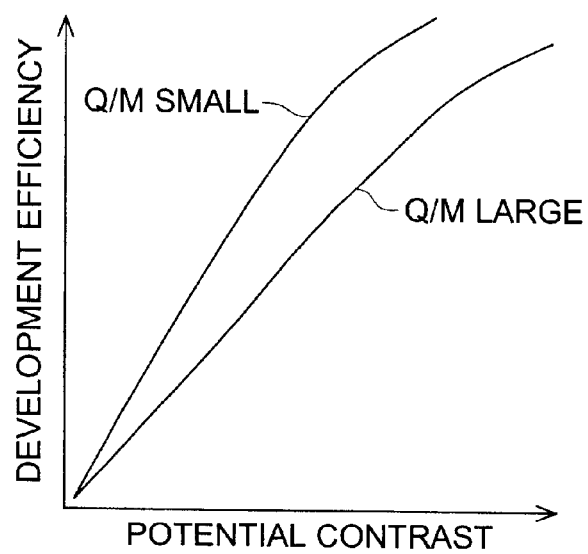

FIG. 9 is a graph showing relationship between an amount of electrostatic charges and development efficiency.

Figure 10:
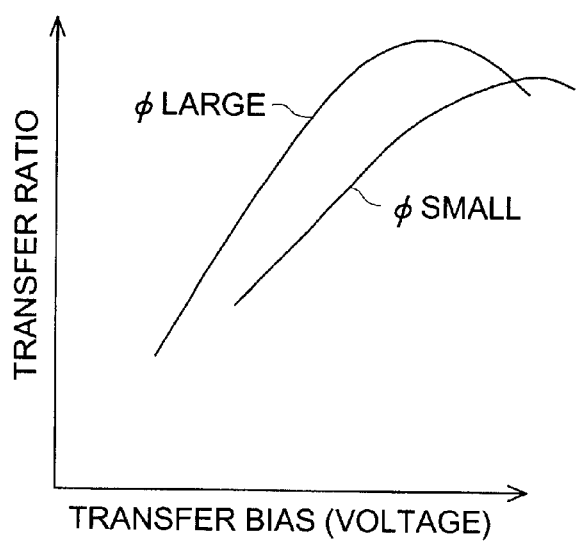

FIG. 10 is a graph showing relationship between a toner particle size and transfer ratio.

Figure 11:
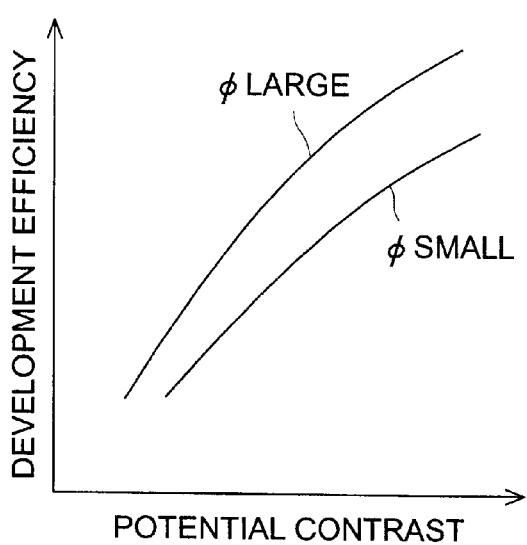

FIG. 11 is a graph showing relationship between a toner particle size and development efficiency.

Figure 12:
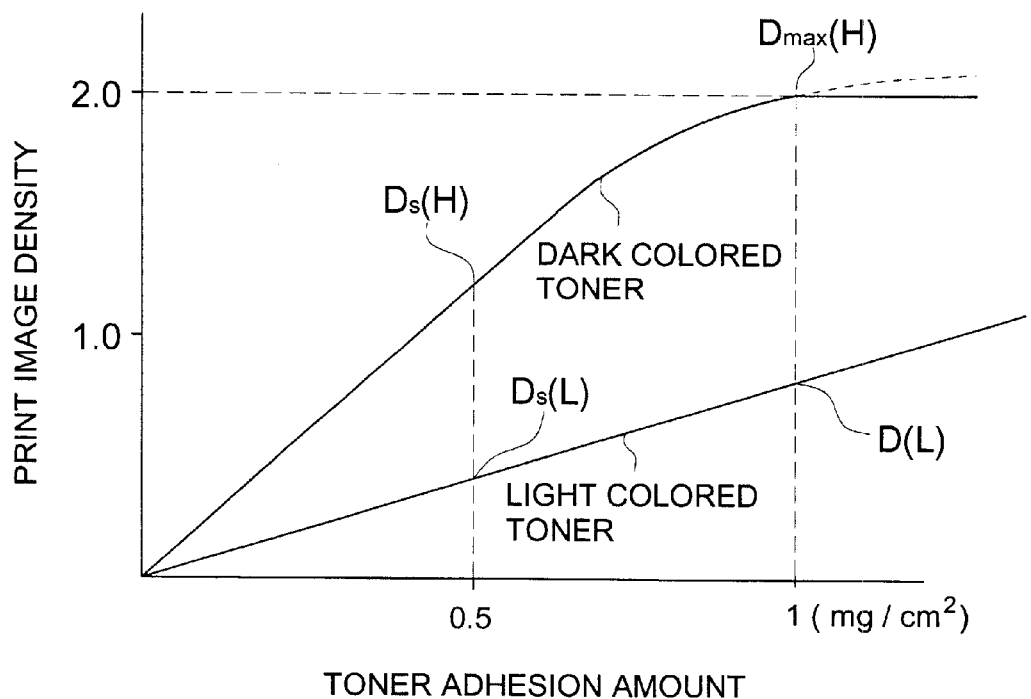

FIG. 12 is a graph showing relationship between a toner adhesion amount and print image density.

Figure 13:
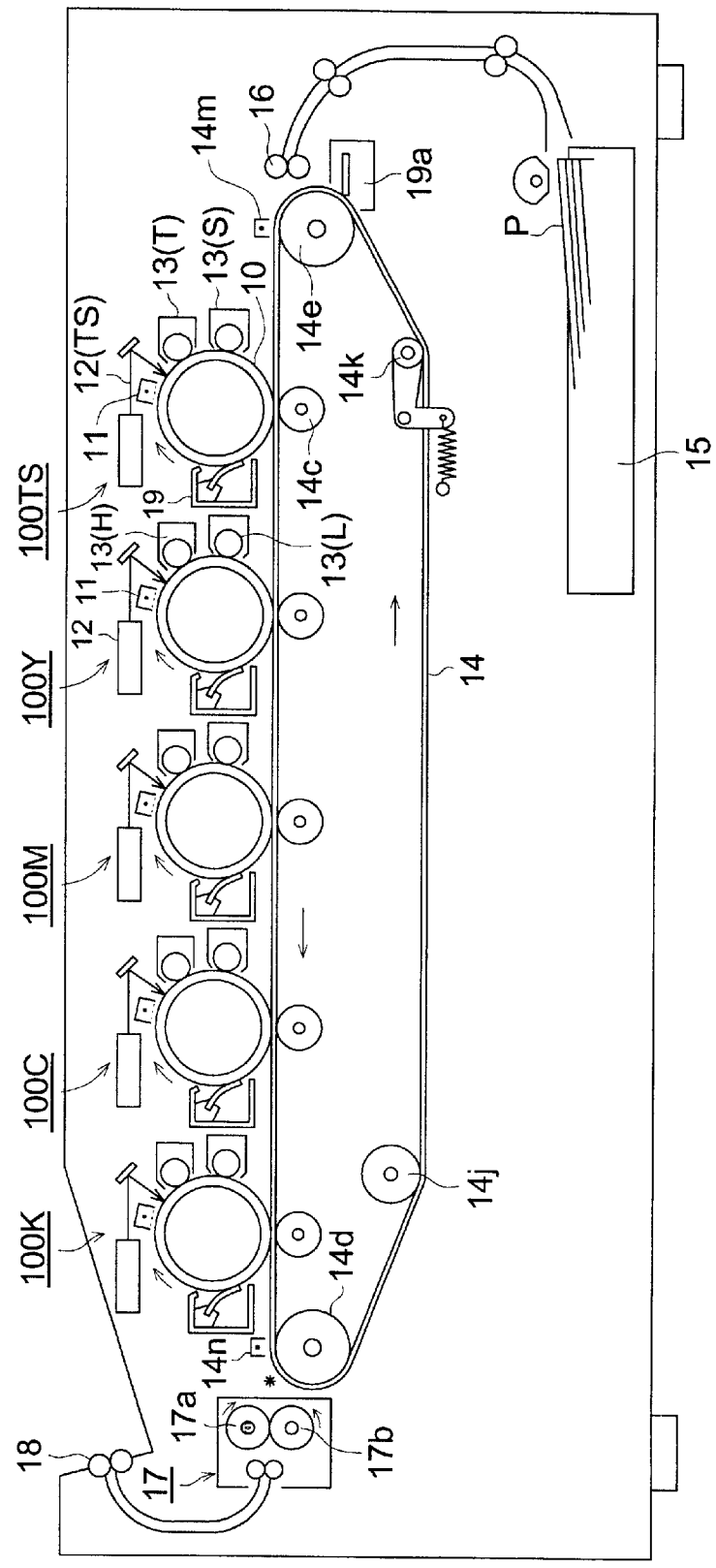

FIG. 13 is a sectional structure diagram of a color image forming apparatus of another embodiment.

Figure 14:
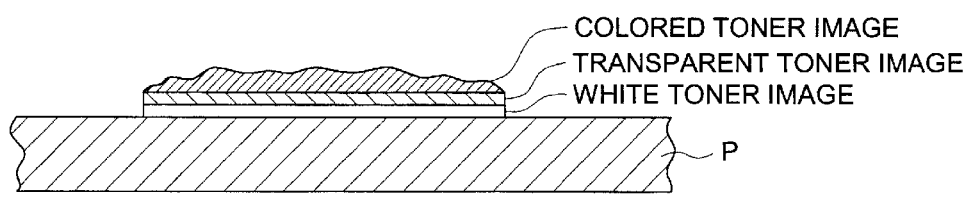
Figure 14:
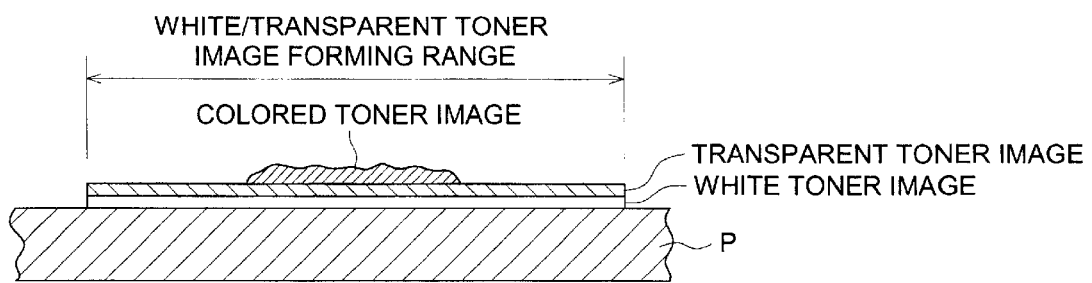

Each of FIGS. 14(a) and 14(b) is an illustration showing how toner is sticking to a recording sheet.

Figure 15:
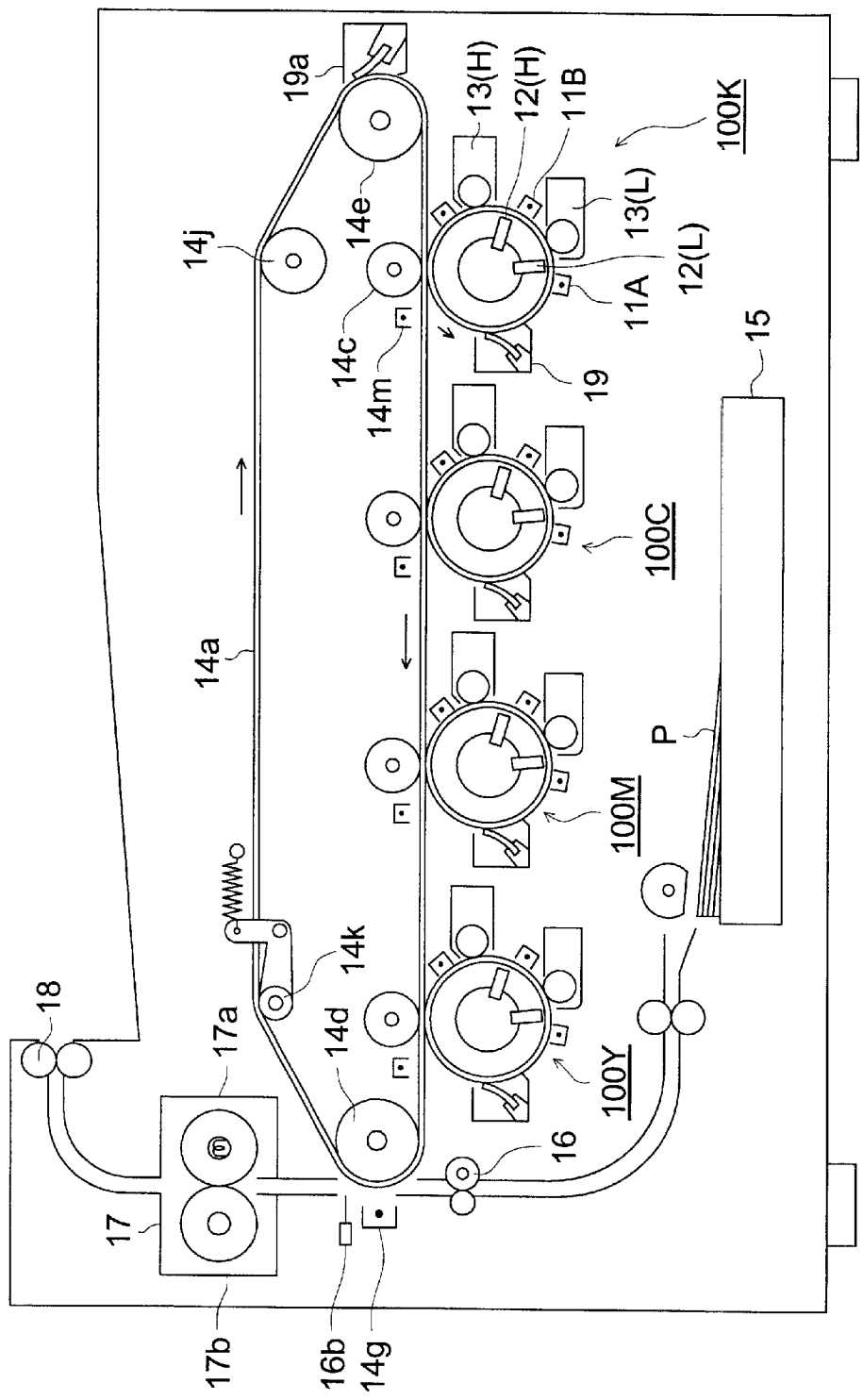

FIG. 15 is a sectional structure diagram of an image forming apparatus of the embodiment.

Figure 16:
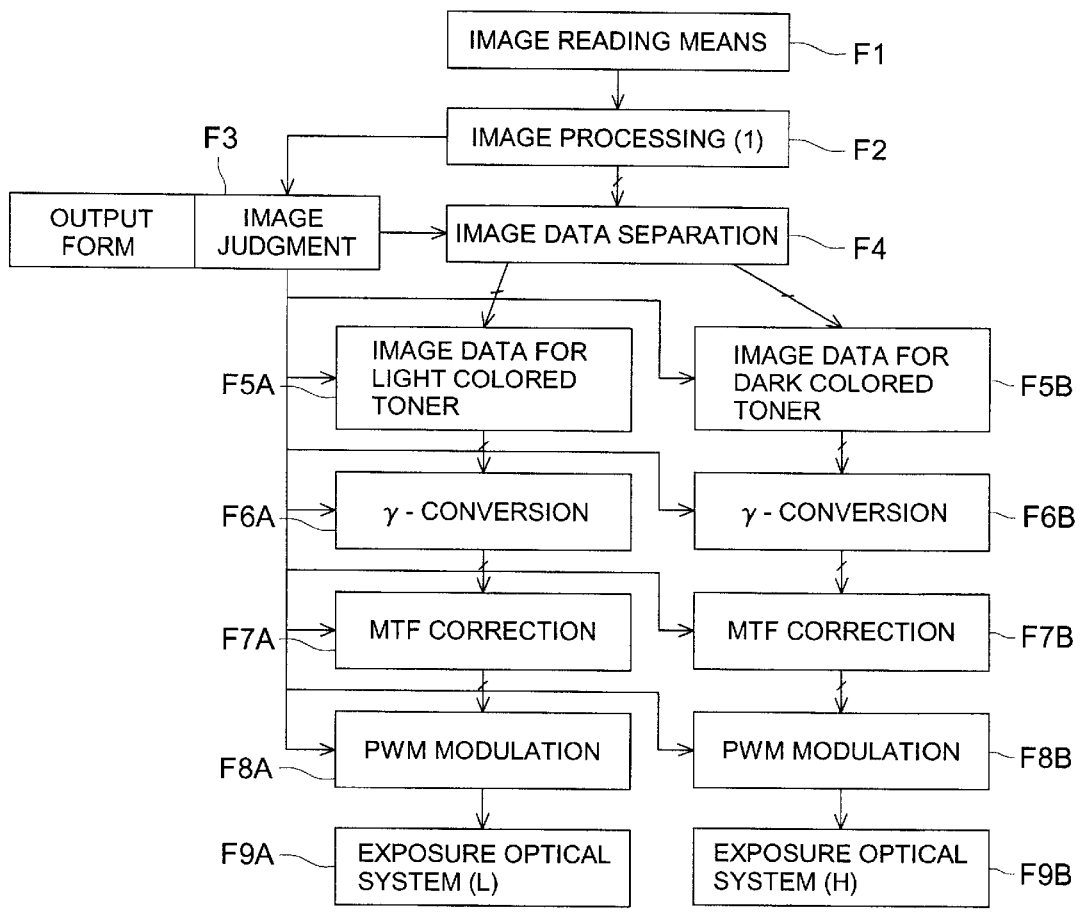

FIG. 16 is a block diagram of an image processing system.

Figure 17:
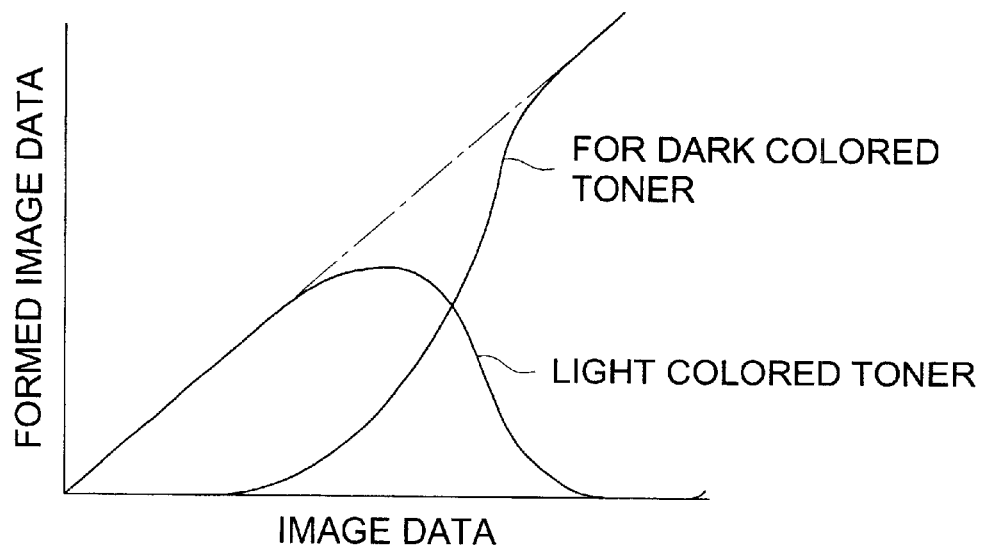
Figure 17:
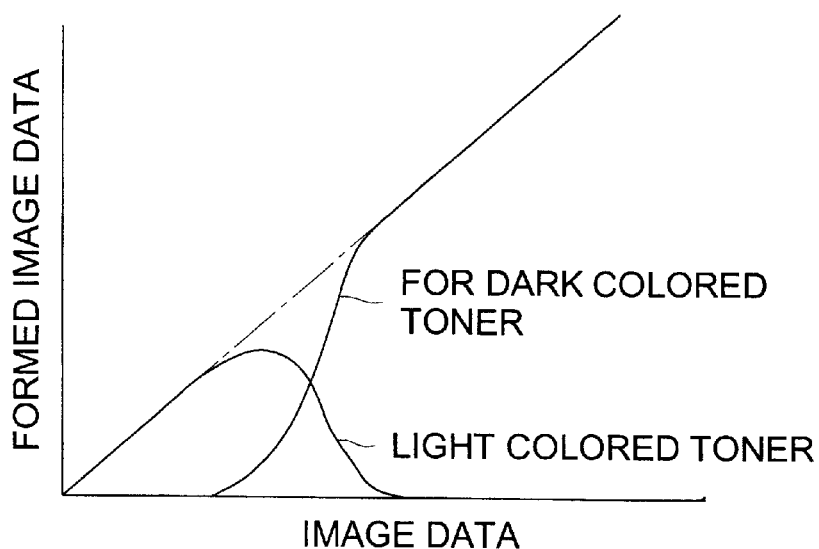

Each of FIGS. 17(a) and 17(b) is an illustration showing how image data are broken down.

FIG. 18 is a graph showing an adhesion amount of toner

Each of FIGS. 19(a), 19(b) and 19(c) is an illustration showing how toner is sticking.

Figure 20:
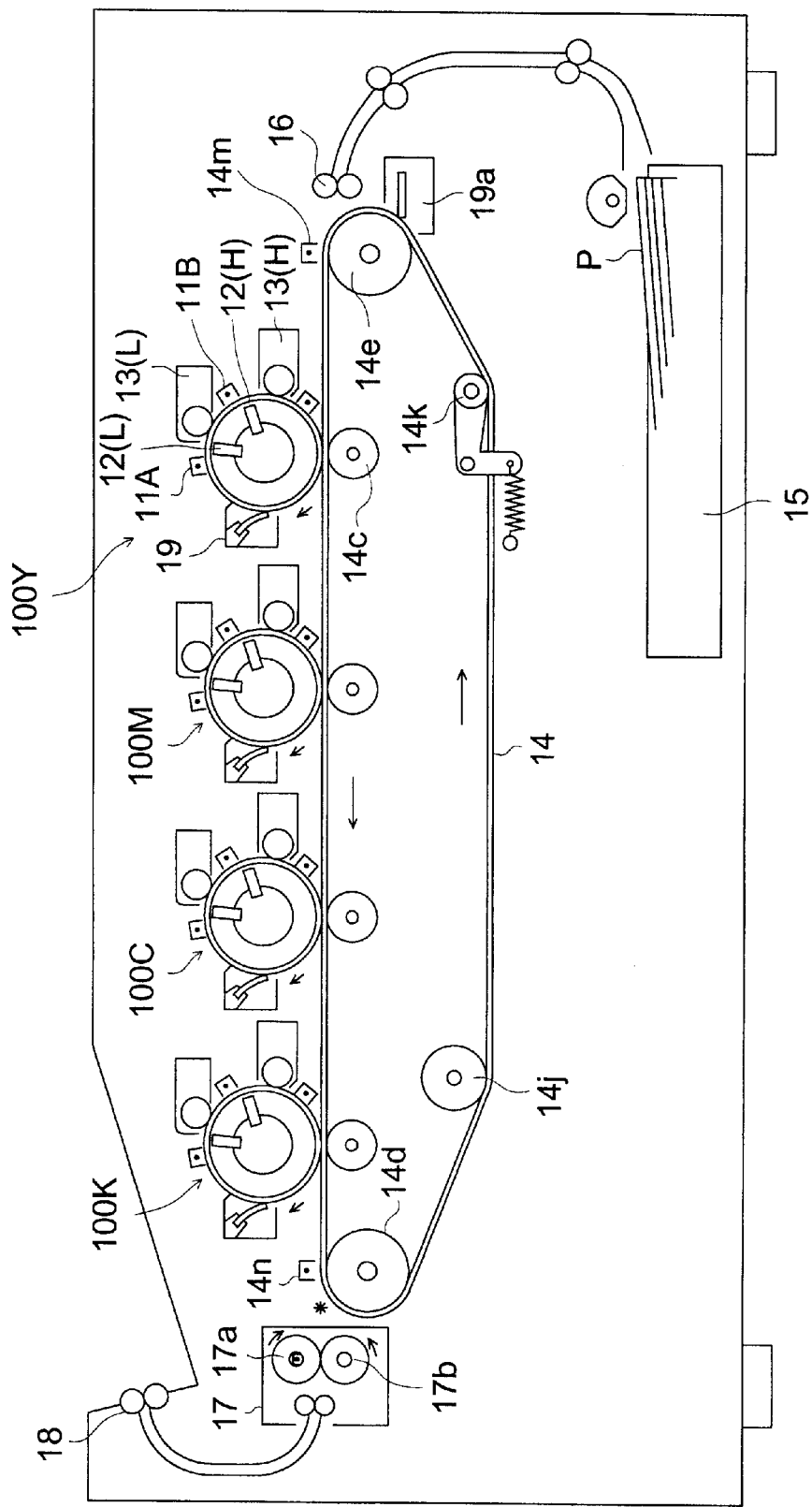

FIG. 20 is a sectional structure diagram of an image forming apparatus of another embodiment.

Figure 21:
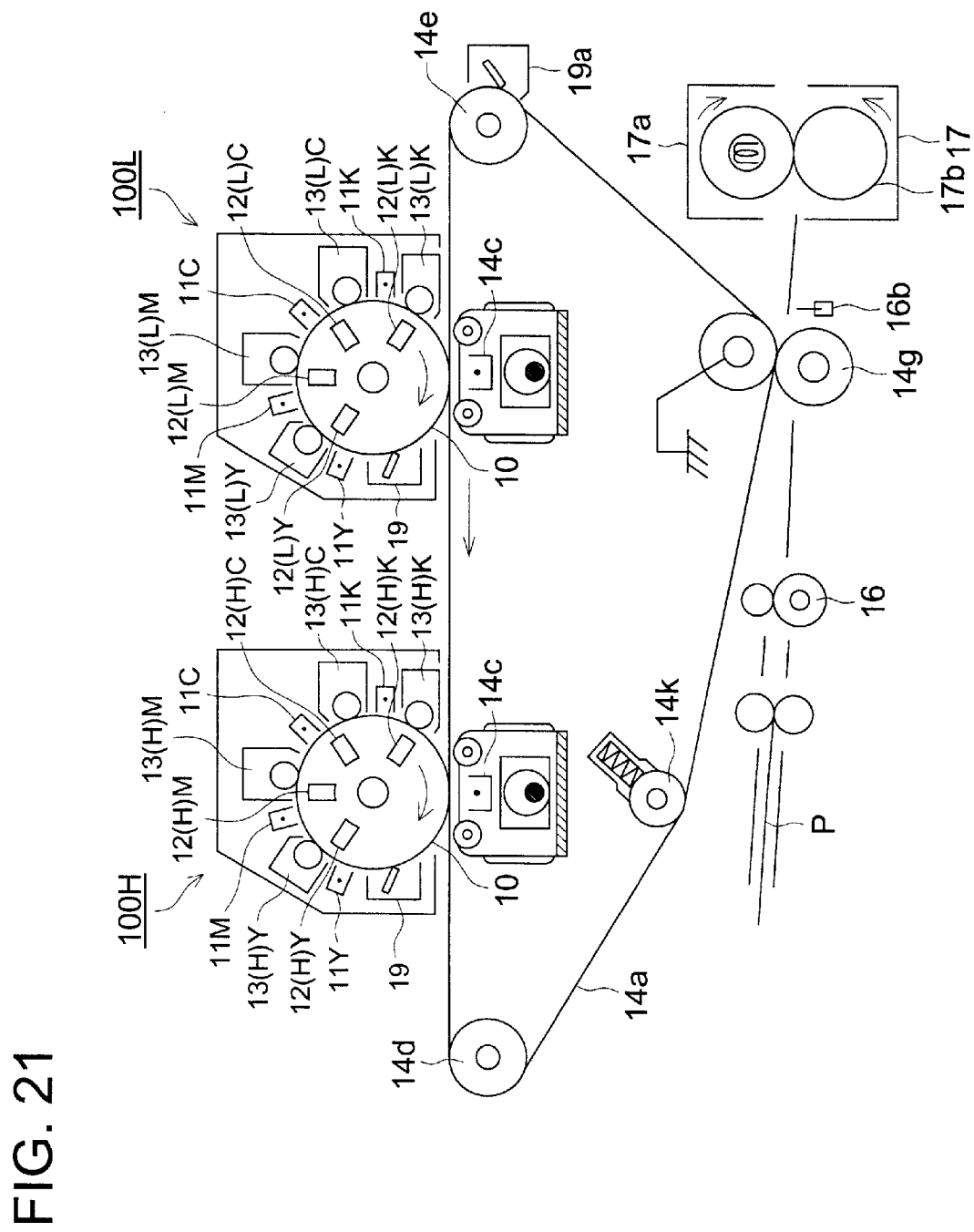

FIG. 21 is a sectional structure diagram of an image forming apparatus of the embodiment.

Figure 22:
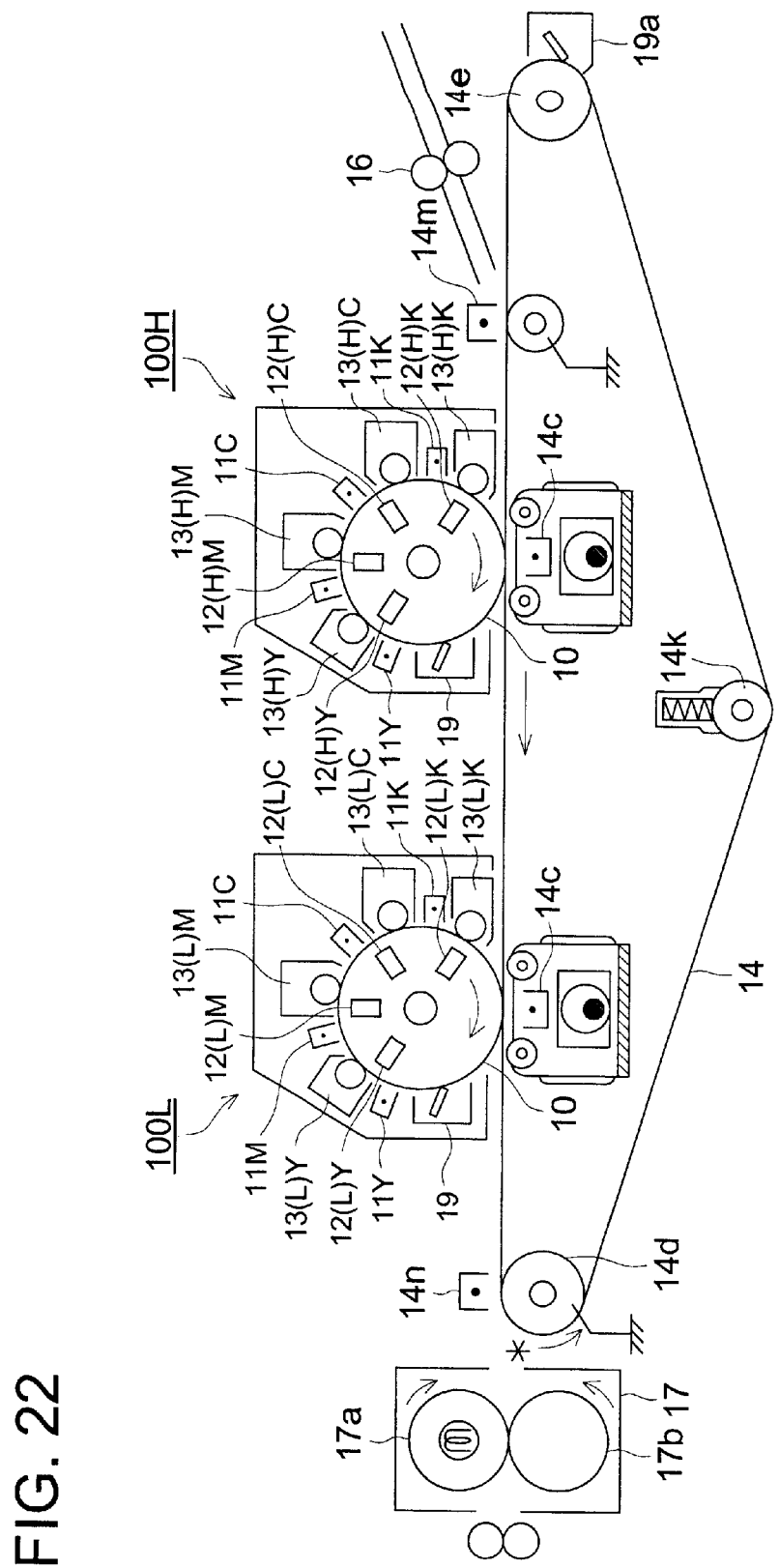

FIG. 22 is a sectional structure diagram of an image forming apparatus of the embodiment.

Figure 23:
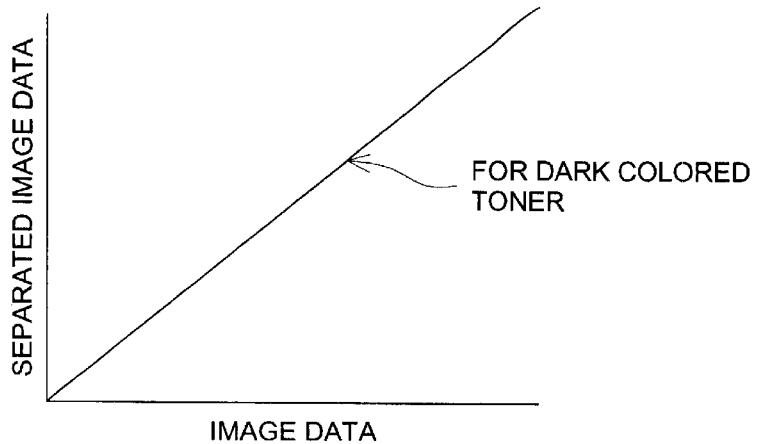
Figure 23:
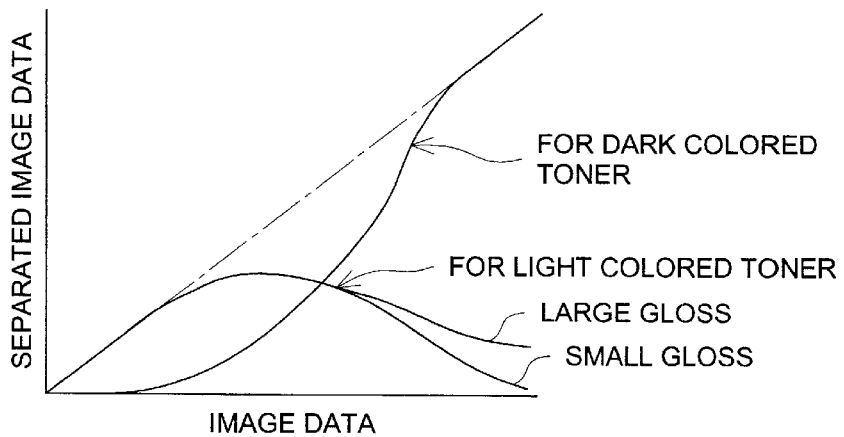
Figure 23:
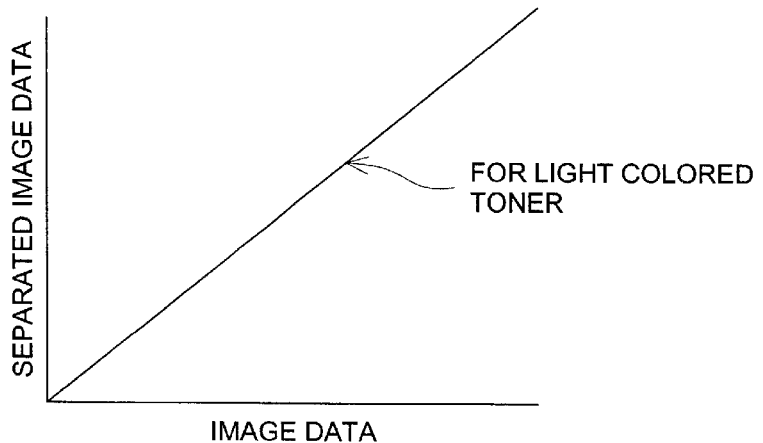

Each of FIGS. 23(a), 23(b) and 23(c) is an illustration of the embodiment showing how image data are broken down.

Figure 24:
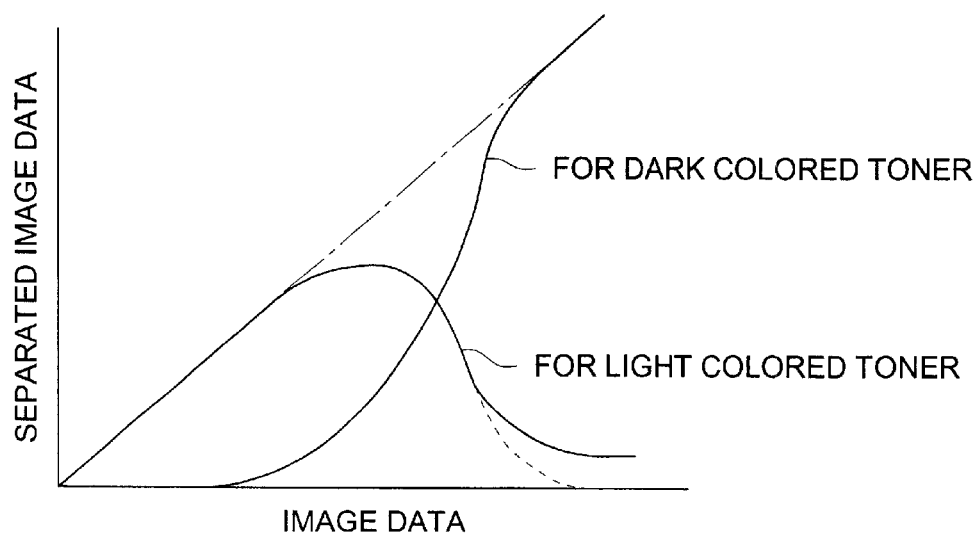
Figure 24:
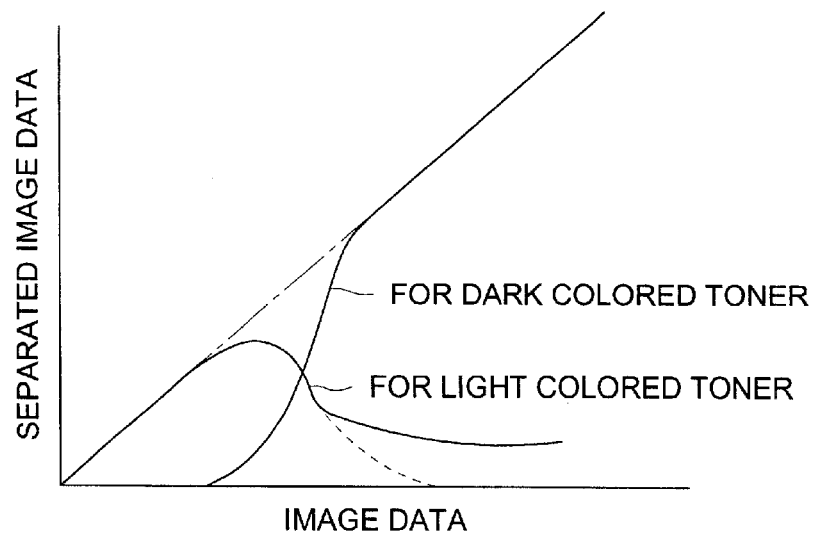

Each of FIGS. 24(a) and 24(b) is an illustration of another embodiment showing how image data are broken down.

Figure 25A:
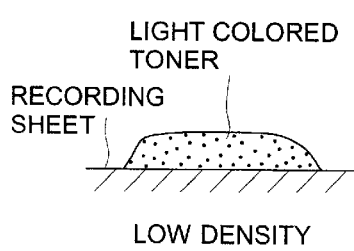
Figure 25B:
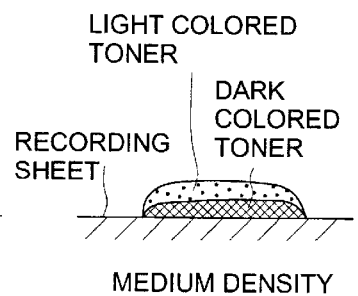
Figure 25C:
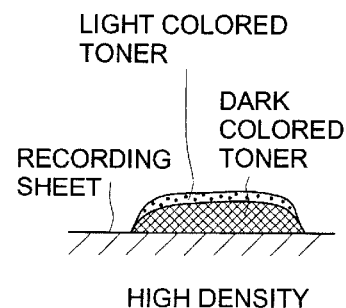

Each of FIGS. 25(a), 25(b) and 25(c) is an illustration showing how toner is sticking.

Figure 26:
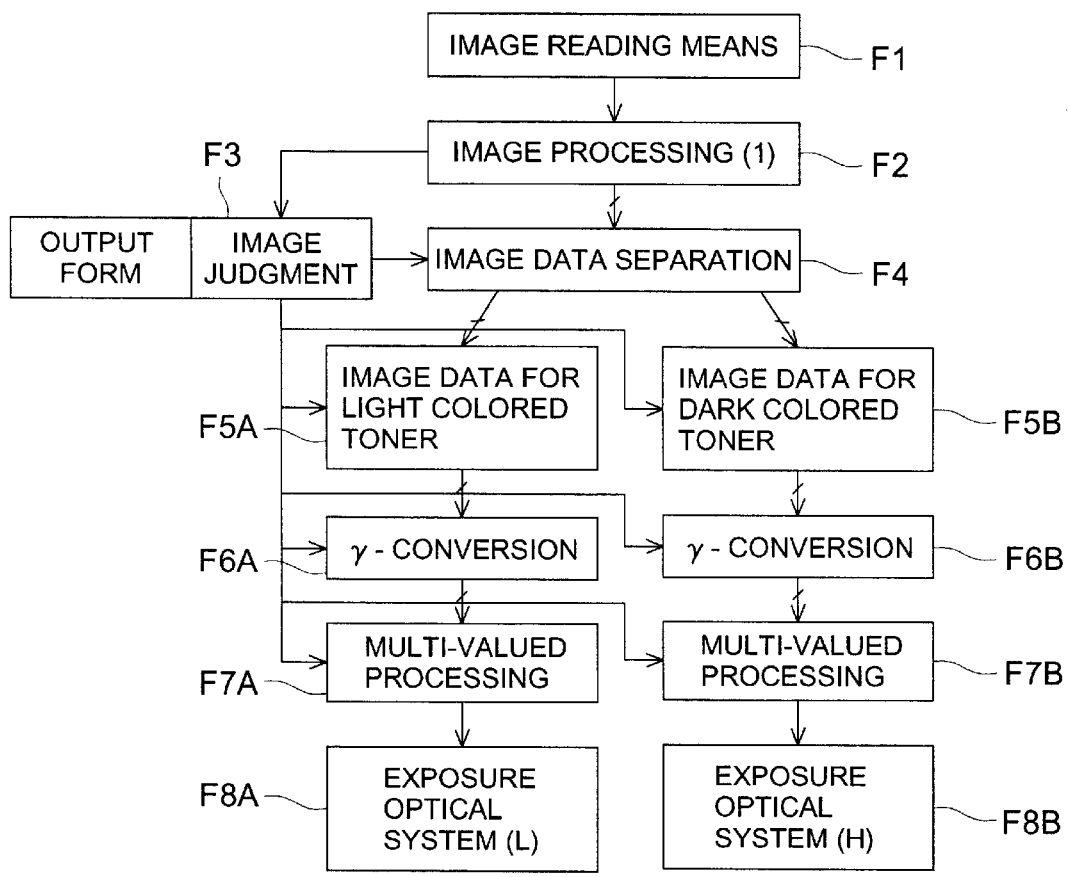

FIG. 26 is a block diagram of an image processing system.

Figure 27:
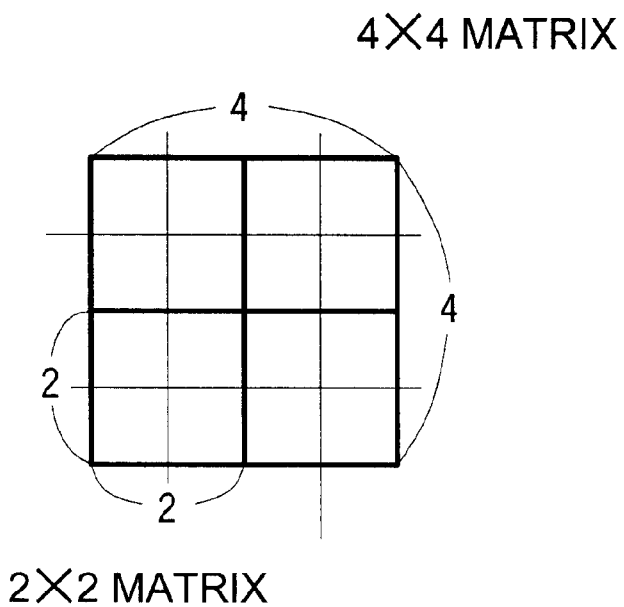

FIG. 27 is an illustration of dither processing.

Figure 28:
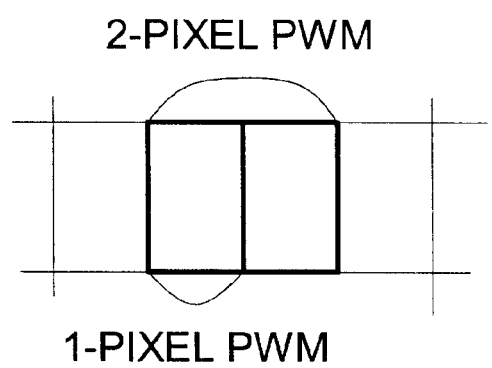

FIG. 28 is an illustration of pulse width modulation processing.

DETAILED DESCRIPTION OF THE PREFERRED EMBODIMENT

An image forming apparatus of the invention is one wherein a latent image is formed on an image forming body by image-wise exposure based on image data in all cases, development is conducted for the latent image thus formed by developing unit (H) containing dark colored toner and developing unit (L) containing light colored toner both in the similar hue, a reproduction area is broadened by conducting development employing dark colored toner and light colored toner in the similar hue, and images excellent in gradation are formed. Since a monochromatic image forming apparatus is of a structure wherein an image forming is conducted in a color image forming apparatus by using dark colored toner and light colored toner for only one color, there will be given explanation here for the structure of a preferable and small-sized color image forming apparatus that forms a color image by using dark colored toner and light colored toner.

Figure 1:
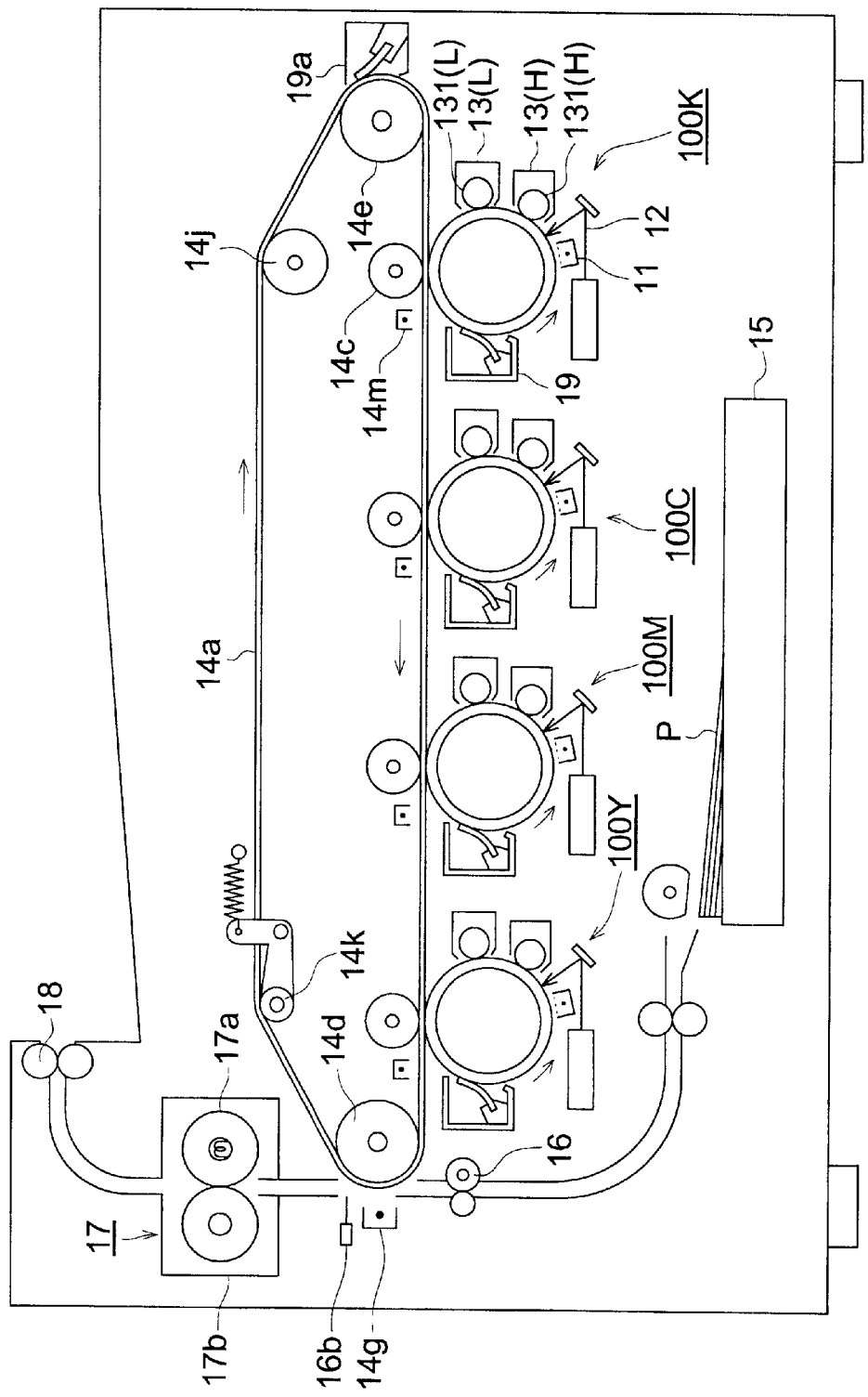
FIG. 1 is a sectional structure diagram of a color image forming apparatus of the present embodiment.
Figure 2:
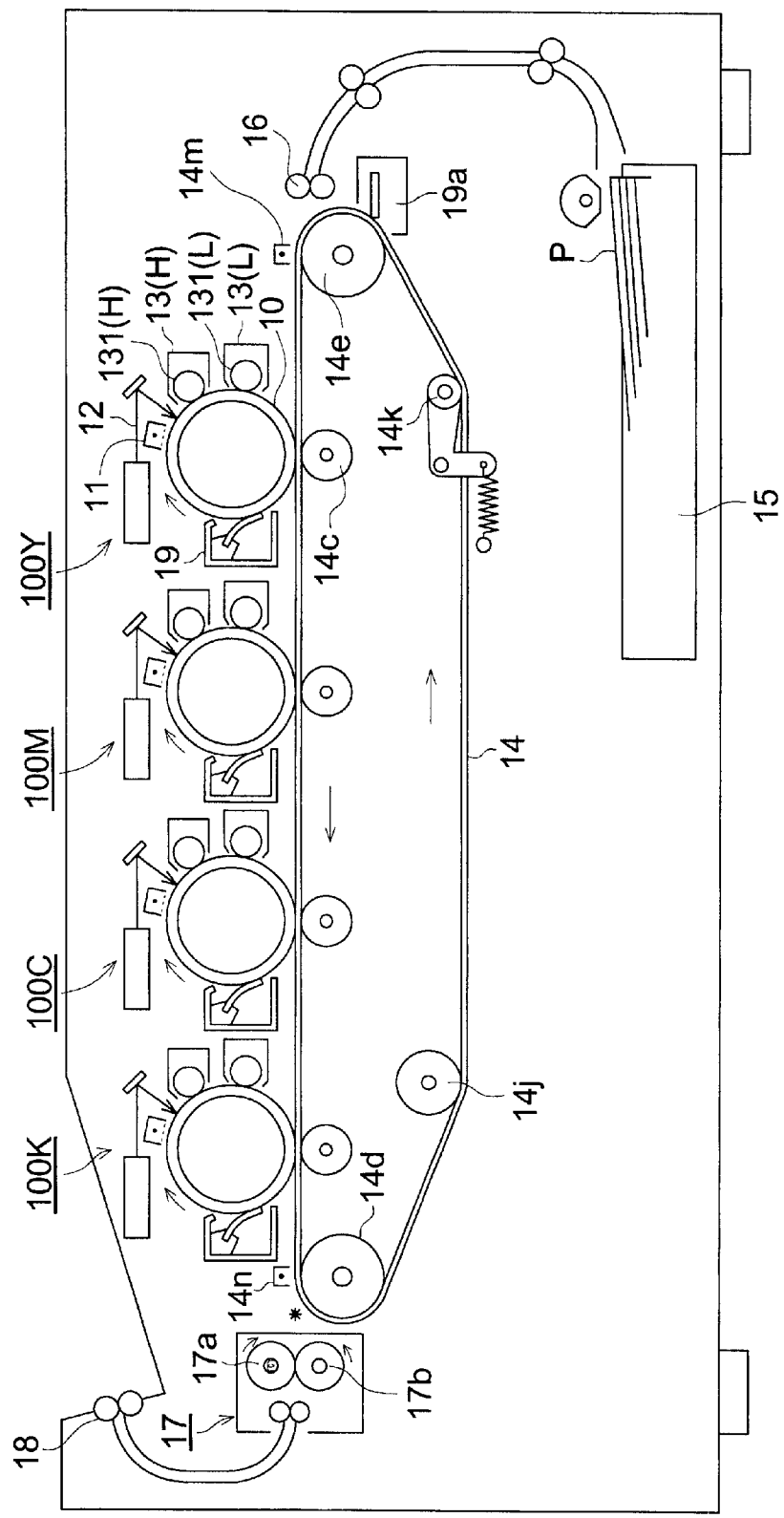
FIG. 2 is a sectional structure diagram of a color image forming apparatus of another embodiment.

(1) As shown in a sectional structure diagram in FIGS. 1 and 2, the present embodiment is represented by an image forming apparatus for conducting image forming by superposing a dark colored toner image and a light colored toner image through repetition of charging, image-wise exposure and development employing dark colored toner and light colored toner on an image forming body, and it is, in particular, a color image forming apparatus which is characterized to be small in size and conducts color image forming, in a tandem mode, by superposing a dark colored toner image and a light colored toner image for each color of Y, M, C and K.

A color image forming apparatus shown in FIG. 1 is a color image forming apparatus of a tandem type employing an intermediate transfer body, and 4 sets of process units 100 composed of yellow (Y), magenta (M), cyan (C) and black (K) are provided on a peripheral portion of transfer belt 14a representing the intermediate transfer body. On each process unit 100, there are formed toner images for Y, M, C and K each employing dark colored toner and light colored toner, then, the toner images are transferred and superposed on transfer belt 14a, and the transferred color toner images are transferred collectively onto a recording sheet representing a transfer material to be fixed and ejected out of the apparatus.

Since 4 sets of process units 100 are of the common structure, one set of them will be explained. Photoreceptor drum 10 representing an image forming body is one wherein a photoconductor layer including a conductive layer and an organic photoconductor (OPC) layer is formed on an outer circumferential surface of a cylindrical base body.

Photoreceptor drum 10 is rotated counterclockwise as shown with an arrow, by power from an unillustrated driving source, or by transfer belt 14a, with its conductive layer grounded.

The numeral 11 is a scorotron charging unit representing a charging means, and it is mounted in the vicinity of photoreceptor drum 10 to face it in the direction perpendicular to the moving direction of the photoreceptor drum 10, to give uniform potential to the photoreceptor drum 10 through corona discharge having the same polarity as that in toner.

The numeral 12 is an exposure optical system that conducts image-wise exposure based on image data, and its example is a scanning optical system wherein a polygon mirror conducts scanning in parallel with a rotary shaft of the photoreceptor drum 10. When image-wise exposure is given on the photoreceptor drum 10 charged uniformly by the exposure optical system 12, a latent image is formed.

The numeral 13 represents a developing unit, and developing unit 13(H) containing dark colored toner is arranged at the upstream side in the direction of rotation of photoreceptor drum 10, while, developing unit 13(L) containing light colored toner is arranged at the downstream side. The developing unit 13(H) is equipped with developing sleeve 131(H), and dark colored toner held on the rotating developing sleeve 131(H) is conveyed to the portion on the photoreceptor drum 10 facing the developing sleeve. On the developing sleeve 131(H), there is impressed developing bias potential $V_H$ having the same polarity as that of toner, and reversal development by dark colored toner is performed on the latent image, under a contact mode or a non-contact mode, preferably under the contact mode. In the same way, developing bias potential $V_L$ having the same polarity as that of toner is impressed even on developing sleeve 131(L) of the developing unit 13(L), and reversal development by light colored toner is performed on the toner image of dark colored toner. Though this reversal development is can be conducted under a soft contact mode, non-contact development is preferable from the viewpoint of prevention of damage or mixing of color for the preceding toner image. With regard to the developing bias to be impressed in this case, it is preferable that A.C. component is also superposed on the developing bias, and non-contact development is carried out. Developing bias potential $V_H$ to be impressed in this case is established to be the same in terms of polarity as developing bias potential $V_L$, and to be in the relationship of $|(½)\ V_O|<|V_H|<|V_L|<|V_O|$. This toner image is transferred at the transfer position on transfer belt 14a which will be explained later. Toner remaining on the drum after transferring is removed by cleaning unit 19 which collects electrostatically.

The transfer belt 14a which is opposed in parallel by process units 100 for four colors of Y, M, C and K is an endless belt having volume resistivity of $10^{10}$–$10^{15}$ Ω·cm and surface resistivity of $10^{10}$–$10^{15}$ Ω/□. For example, it is a 2-layer seamless belt wherein a fluorine coating having a thickness of 5–50 μm is preferably applied as a toner filming prevention layer on the outer side of a 0.1–1.0 mm —thick semiconductive film base body in which conductive materials are dispersed in engineering plastic such as modified polyimide, thermosetting polyimide, ethylenetetrafluoro ethylene copolymer, polyfluoro vinylidene and nylon alloy. In addition to the foregoing, it is also possible to use, as a base body for the transfer belt 14a, a 0.5–2.2 mm—thick semiconductive rubber belt in which conductive materials are dispersed in silicone rubber or urethane rubber. The transfer belt 14a is trained to be circumscribed on drive roller 14d, driven roller 14e, tension roller 14k and backup roller 14j, and when an image is formed, drive roller 14d is driven by an unillustrated drive motor to be rotated, and the transfer belt 14a is pressed on photoreceptor drum 10 by primary transfer unit 14c at a transfer position for each color, thus, the transfer belt 14a is rotated in the direction shown with an arrow.

The primary transfer unit 14c which represents a transfer means for each color and is composed of a transfer roller is provided to face photoreceptor drum 10 for each color through the transfer belt 14a so that a transfer area (having no symbol) for each color is formed between the transfer belt 14a and photoreceptor drum 10. On the primary transfer unit 14c for each color, there is impressed D.C. voltage having polarity opposite to that of toner, and a transfer electric field is formed on the transfer area, and thereby, a toner image on photoreceptor drum 10 for each color is transferred onto the transfer belt 14a.

Neutralizing unit 14n representing a neutralizing means for each color is preferably composed of a corona discharging unit, and it neutralizes the transfer belt 14a charged by the primary transfer unit 14c.

Upon start of image recording, an unillustrated motor for driving a photoreceptor starts to rotate photoreceptor drum 10 of process unit 100 for black (K) in the direction shown with an arrow in the drawing, simultaneously with this, charging operation of scorotron charging unit 11 starts giving potential to photoreceptor drum 10 for K.

After the photoreceptor drum 10 for K is given potential, image writing thereon by electric signals corresponding to image data for the first color signal, namely, for K is started by exposure optical system 12 for K, and an electrostatic latent image corresponding to an image for K in document images is formed on the surface of the photoreceptor drum 10 for K.

For the latent image for K stated above, reversal development is conducted by developing unit 13(h) for dark colored toner under the non-contact mode, and an image of dark colored toner for K is formed in accordance with rotation of photoreceptor drum 10 for K. Then, an image of light colored toner for K is formed by developing unit 13(L) for light colored toner, on the dark colored toner image formed previously.

The toner image for K composed of dark colored toner and light colored toner formed by the image forming process stated above on photoreceptor drum 10 for K representing an image forming body is transferred onto transfer belt 14a by primary transfer unit 14c for K representing the first transfer means in a transfer area for K (having no symbol).

Then, transfer belt 14a is synchronized with a toner image for C, and a toner image composed of dark colored toner and light colored toner both for C corresponding to image data for C based on the second color signal which is formed on photoreceptor drum 10 for C by process unit 100 for cyan (C) is formed to be superposed on the toner image composed of dark colored toner and light colored toner both for K by primary transfer unit 14c for C representing the first transfer means at the transfer area for C (having no symbol).

In the same process as in the foregoing, being synchronized with the superposed toner images for K and C, a toner image composed of dark colored toner and light colored toner both for M corresponding to image data for M based on the third color signal which is formed on photoreceptor drum 10 for M by process unit 100 for magenta (M) is formed to be superposed on the toner images for K and C by primary transfer unit 14c for M representing the first transfer means at the transfer area for M (having no symbol). Further, being synchronized with the superposed toner images for K, C and M, a toner image composed of dark colored toner and light colored toner both for Y corresponding to image data for Y based on the fourth color signal which is formed on photoreceptor drum 10 for Y by process unit 100 for yellow (Y) is formed to be superposed on the toner images for K, C and M by primary transfer unit 14c for Y representing the first transfer means at the transfer area for Y (having no symbol).

Toner remaining on a circumferential surface of photoreceptor drum 10 for each color after transfer is removed by cleaning unit 19 representing a cleaning means of an image forming body for each color.

In synchronization with formation of superposed color toner images on transfer belt 14a, recording sheet P is conveyed to a transfer area (having no symbol) of secondary transfer unit 14g representing the second transfer means from sheet feed cassette 15 that is a transfer material storing means through timing roller 16 representative of a transfer material feeding means, and the superposed color toner images on transfer belt 14a are transferred collectively on the recording sheet P.

The recording sheet P on which the color toner images have been transferred is neutralized by neutralizing electrode 16b representing a separation means composed of a serrate electrode plate and is conveyed to fixing unit 17 where fixing roller 17a and pressure contact roller 17b apply heat and pressure on the recording sheet P positioned between them so that the toner images on the recording sheet P are fixed, and the recording sheet P is ejected by ejection roller 18 to a tray located outside the apparatus.

Toner remaining on a circumferential surface of transfer belt 14a after transfer is removed by cleaning unit 19a representing a cleaning means of a transfer belt provided to face driven roller 14e through the transfer belt 14a.

In the present embodiment, for the latent image formed on photoreceptor drum 10 of process unit 100 after image-wise exposure thereon, a high density part of the latent image is developed selectively first by developing unit 13(H) storing dark colored toner, and then, a low density part of the latent image is developed by developing unit 13(L) storing light colored toner, as will be explained in detail later. In the use of both dark colored toner and light colored toner, when the low density part is developed selectively by the use of light colored toner, a color reproduction range is extended, while, when the high density part is developed selectively by the use of dark colored toner, a dynamic range is extended, which makes it possible to obtain images with high image quality.

In the present embodiment, development is conducted by using both dark colored toner and light colored toner for each of 4 colors of Y, M, C and K. However, an excellent effect of the invention can also be obtained even in the arrangement wherein only dark colored toner is used for each of Y, M and C for development, and dark colored toner and light colored toner are used only for K for development. In this case, five sets of developing units are provided in an image forming apparatus.

There has been explained a small-sized image forming apparatus wherein a reproduction area is broadened by using dark colored toner and light colored toner and color superposing is conducted easily with reference to FIG. 1. What is shown in FIG. 2 is a sectional structure diagram of a color image forming apparatus showing another embodiment which also exhibits the same effect. As far as the point that process units 100 which form toner images for Y, M, C and K by using dark colored toner and light colored toner are arranged in parallel is concerned, the color image forming apparatus stated above is exactly the same as what is shown in FIG. 1. In the present embodiment, however, toner images are superposed on a transfer material without intervention of an intermediate transfer body. With regard to the points different from what is shown in FIG. 1, recording sheet P ejected out of sheet feed cassette 15 is conveyed, for image forming, to conveyance belt 14 through timing roller 16, in synchronization with toner image forming on process unit 100.

The recording sheet P thus conveyed is charged by sheet charging unit 14m to be in the same polarity as toner, and it comes in close contact with rotating conveyance belt 14 to be conveyed thereby, during which a toner image that is formed on process unit 100Y and is composed of dark colored toner and light colored toner both for Y is transferred by primary transfer unit 14c onto the recording sheet P, and on the toner image thus transferred, there are superposed toner images for M, C and K each being composed of dark colored toner and light colored toner formed respectively on process unit 100M, process unit 100C and process unit 100K to be transferred, thus, a color toner image is formed.

The recording sheet P carrying a color toner image is neutralized by separation electrode 14n, then is separated from conveyance belt 14 to be conveyed to fixing unit 17 where the color toner image on the recording sheet P is fixed, and the recording sheet P is ejected to a tray located outside the apparatus.

Even in the embodiment shown in FIG. 2, it is possible to employ either an arrangement wherein dark colored toner only is used in development for Y, M and C, and dark colored toner and light colored toner are used in development only for K, or an arrangement wherein dark colored toner only is used in development for Y, and dark colored toner and light colored toner are used in development for K, C and M, and excellent effects of the invention can be exhibited in both cases. It is further possible to apply the invention to a monochromatic image forming apparatus for a single color of K.

Each of FIGS. 3(a) and 3(b) is an illustration showing the state of potential for a high density part and a low density part of a latent image and the state of toner adhesion. A photosensitive layer of photoreceptor drum 10 charged uniformly to charged voltage $V_0$ of 500–1000 V usually by scorotron charging unit 11 is subjected to image-wise exposure by exposure optical system 12, and thereby, latent images for high density part, medium density part and low density part each being at different voltage are formed. With regard to the high density part which is maximum, several tens V for residual voltage usually remains, which, however, goes down almost to zero V.

In step space 1 shown in FIG. 3(a), the first reversal development is conducted by developing unit 13(H) that stores dark colored toner and is impressed with developing bias voltage $V_H$. Since an absolute value of the developing bias voltage $V_H$ to be impressed here is set to voltage that is $V_0/2$ or more and is lower than latent image voltage on the low density part, when a latent image on photoreceptor drum 10 moves to the position that faces developing sleeve 131(H), an electric field for development is formed at a high density part and a medium density part between developing sleeve 131(H) and the high density part and the medium density part, and dark colored toner is stuck electrostatically to the high density part and the medium density part, thus, the first development is conducted. On the low density part, however, no electric field for development is formed between the low density part and developing sleeve 131(H), and thereby, no dark colored toner is stuck. It is preferable that developing bias voltage $V_H$ is (0.5–0.8) $V_0$ for charged voltage $V_0$ of a photoreceptor. Incidentally, A.C. bias voltage may be superposed on this developing bias voltage $V_H$. By doing this, it is possible to enable dark colored toner to stick to the medium density part, and thereby, to lower an adhesion boundary with light colored toner to the lower density. This makes it possible to realize gradation wherein density is changed smoothly from the low density part by light colored toner. Further, a broad area where dark colored toner and light colored toner are present makes the gradation to be stabilized, and makes an image noise to be hardly sensed.

When photoreceptor drum 10 on which dark colored toner sticks to the latent image portion from high density part to medium density part in step 2 shown in FIG. 3(b) arrives at the position facing developing sleeve 131(L) of developing unit 13(L) that stores light colored toner and is impressed with developing bias voltage $V_L$, the second development by light colored toner is conducted. Since the developing bias voltage $V_L$ is established to voltage that is $V_0/2$ or more and is between developing bias voltage $V_H$ and charged voltage $V_0$ of a photoreceptor, an electric field for development is formed at the low density part between developing sleeve 131(L) and the low density part, and thereby, light colored toner sticks electrostatically to the low density part. Further, on the high—medium density parts where dark colored toner is sticking electrostatically thereto, a large part (70–90%) of latent image potential still remains, and light colored toner sticks electrostatically to dark colored toner on the high—medium density parts accordingly. It is preferable that developing bias voltage $V_L$ is higher than $V_H$ for charged voltage $V_0$ of a photoreceptor, and it is (0.7–0.9) $V_0$. Incidentally, A.C. bias may also be superposed on this developing bias voltage $V_L$.

Each of FIGS. 3(a) and 3(b) shows how light colored toner is sticking, and for obtaining toner images with high image quality, it is necessary that the total toner adhesion amount for dark colored toner and light colored toner is limited, light colored toner in large quantities sticks electrostatically to a low density part, dark colored toner and light colored toner are sticking and gradation is changed smoothly in a medium density part, dark colored toner in large quantities is sticking in a high density part, and an adhesion amount for light colored toner is restricted. Following means (1) and (2) which will be explained below are employed to satisfy the aforesaid conditions for toner sticking.

(1) In the case of the same potential contrast, an adhesion amount of light colored toner is made to be larger than that of dark colored toner. Namely, as described later, there is conducted setting to raise developability of light colored toner. On the other hand, at the high potential contrast portion, it is preferable to control so that the maximum toner adhesion amount for light colored toner may be less than an adhesion amount for dark colored toner. To be concrete, for example, when developing unit 13(H) and developing unit 13(L) are the same in terms of a shape, the speed of rotation of developing sleeve 131(L) is set to be lower than that for developing sleeve 131(H), and an amount of light colored toner to be supplied to a developing area in the course of development is limited to be low. By doing this, an adhesion amount for light colored toner is made to be large when potential contrast is small, and preferably, an adhesion amount for light colored toner is restricted when potential contrast is great, and thereby, an adhesion amount for light colored toner is restricted to be less even in the high density part as shown in a graph showing relationship between potential contrast and a toner adhesion amount in FIG. 4, and the totaled toner adhesion amount for the high density part is also restricted.

(2) In the case of the same potential contrast, the control is conducted so that γ characteristics for light colored toner may be higher than those for dark colored toner. Since γ characteristics (potential contrast—image density) for dark colored toner and light colored toner are changed also by developing characteristics for light colored toner and dark colored toner and developing bias voltage, it is necessary to conduct γ correction in the course of development. By setting γ characteristics for light colored toner to be higher than those for dark colored toner as shown on a graph indicating relationship between potential contrast (=developing bias—latent image potential) and image density in FIG. 5, light colored toner. in sufficient quantity sticks electrostatically to the low density part, and a color reproducing range is expanded.

In the present embodiment, toner in an appropriate amount sticks to the low density part, both dark colored toner and light colored toner stick to the medium density part, and excessive toner does not stick to the high density part, and therefore, toner sticks evenly to a latent image portion, and a toner image is transferred satisfactorily. In addition, since light colored toner is sticking on the upper layer of dark colored toner, even when uneven transfer is caused, it is caused on the portion where light colored toner is sticking, and uneven transfer is hardly recognized.

FIG. 6 shows relationship of latent image potential, image density and a toner adhesion amount which are obtained as results of development using dark colored toner in developing unit 13(H) employ the aforesaid means (1) and (2) and succeeding development using light colored toner in developing unit 13(L).

In the invention, image-wise exposure on photoreceptor drum 10 by exposure optical system 12 is conducted after image processing is carried out for image density data for each color of Y, M, C and K.

FIG. 7 shows a block diagram of an image processing system in the present embodiment. Images of a document are read by an image reading means employing a solid state image pick-up element such as CCD (F1). Analog image means output-amplified from CCD is A/D-converted into digital signal of 8–10 bits for each one pixel, and shading correction and luminance information after shading correction are converted into density information of 256 levels (F2).

Then, color processing such as masking, UCR or color correction is conducted (F3) in image processing (2). The masking to be used includes linear masking in general, and includes masking employing non-linear masking or a look-up table when conducting color correction at a higher level. In the UCR, there is conducted processing wherein a gray component is eliminated from 3-color components and is replaced with black (K) to improve reproduction of a shadow portion and a character portion.

Image data obtained next are subjected to γ correction for each toner (F4), then, are subjected to multi-valued processing (F5), and are outputted to exposure optical system 12 so that image forming is carried out on a printer (F6).

In the present embodiment, image data obtained through image processing (1) are subjected to checking of density distribution of the data and of density difference between adjoining dots so that there may be conducted image judgment to find whether document images are normal contrast images such as photographs and pictures or character images such as characters or line graphics (F11). When the output form is specified to be an image mode for characters, or photographs and pictures, the ratio of dark colored toner to light colored toner to be used is determined based on that specification (F12).

When judged to be normal contrast images, there is conducted control to reduce an amount of dark colored toner to be used and to increase an amount of light colored toner to be used. Namely, an absolute value of developing bias voltage $V_H$ of developing unit 13(H) is set to be low to control to reduce an amount of dark colored toner to be supplied, and an absolute value of developing bias voltage $V_L$ of developing unit 13(L) is set to be high to control to increase an amount of light colored toner to be supplied.

When judged to be character images, there is conducted control to increase an amount of dark colored toner to be used and to decrease an amount of light colored toner to be used. Namely, an absolute value of developing bias voltage $V_H$ of developing unit 13(H) is set to be low to control to reduce an amount of dark colored toner to be supplied, and an absolute value of developing bias voltage $V_L$ of developing unit 13(L) is set to be high to control to increase an amount of light colored toner to be supplied. Namely, an absolute value of developing bias voltage $V_H$ of developing unit 13(H) is set to be high to control to increase an amount of dark colored toner to be supplied, and an absolute value of developing bias voltage $V_L$ of developing unit 13(L) is set to be low to control to decrease an amount of light colored toner to be supplied (F13).

Together with determination of the ratio of dark colored toner to light colored toner to be used in the aforesaid development, UCR, γ correction and multi-valued processing are controlled to be switched as follows for image processing. with regard to an amount of UCR, it is set to be as low as 10–15% for normal contrast images and it is set to be as high as 40–100% for character images.

With regard to γ correction, it is set to be low for normal contrast images and to be high for character images through establishment by switching, in accordance with the ratio of the dark colored toner to light colored toner to be used.

With regard to multi-valued processing, there is conducted establishment by switching to use 2-pixel PWM to raise gradation for normal contrast images and to use 1-pixel PWM because emphasis is put on resolving power for character images.

By changing the ratio of dark colored toner to light colored toner to be used based on judgment whether images are normal contrast images or character images and by changing image processing, as explained above, a dynamic range is extended for normal contrast images, and images are sharp and clear for character images, thus, excellent images which are appropriate for each image are obtained.

The foregoing stated above represents process conditions which make it possible to obtain quality images with sufficient gradation by using both dark colored toner and light colored toner.

Next, physical properties of dark colored toner and light colored toner to be used for development of a common latent image will be explained. In the common latent image, a light colored toner image is formed on a dark colored toner image by development using both dark colored toner and light colored toner. For obtaining an excellent print image, it is necessary that developing, transferring and fixing for dark colored toner are the same as those for light colored toner, in the process of developing, transferring and fixing, and it is necessary that the dark colored toner and light colored toner have physical properties described below.

(1) With regard to a monochromatic image forming apparatus, the following expression holds between average amount of electrostatic charges $Q_H$ for dark colored toner and average amount of electrostatic charges $Q_L$ for light colored toner, for development employing dark colored toner and light colored toner.

$Q_H \fallingdotseq Q_L$

Even when there is a difference between amount of electrostatic charges $Q_H$ and amount of electrostatic charges $Q_L$, the difference in an amount of electrostatic charges needs to be within 25%.

Properties for transfer and development vary depending on an amount of electrostatic charges of toner (Q/M). FIG. 8 is a graph showing transfer properties, and it shows that a transfer ratio varies depending on whether an amount of electrostatic charges (Q/M) is large or small, under the same transfer bias voltage. FIG. 9 is a graph showing development properties, and it shows that development efficiency varies depending on whether an amount of electrostatic charges (Q/M) is large or small, under the same potential contrast (difference between latent image potential and developing bias). For making the transfer properties and the development properties to agree between dark colored toner and light colored toner, a difference of an amount of electrostatic charges between average amount of electrostatic charges $Q_H$ for dark colored toner and average amount of electrostatic charges $Q_L$ for light colored toner needs to be at the amount of electrostatic charges which is mostly the same within 25%. When the difference of an amount of electrostatic charges exceeds 25%, a difference in transfer ratio and that in development efficiency come to be recognized on an image. Average amount of electrostatic charges $Q_H$ and that of electrostatic charges $Q_L$ both representing 7–30 $\mu$c/g are considered to be appropriate, though an appropriate amount of electrostatic charges for toner varies depending on single-component development or two-component development, as explained later.

With regard to a color image forming apparatus to develop by using dark colored toner and light colored toner for each color, the following expression holds between average amount of electrostatic charges for dark colored toner $Q_H(Y)$, $Q_H(M)$, $Q_H(C)$ and $Q_H(K)$ for each color and average amount of electrostatic charges $Q_L$ for light colored toner $Q_L(Y)$, $Q_L(M)$, $Q_L(C)$ and $Q_L(K)$ for each color.

$Q_H(Y) \fallingdotseq Q_L(Y)$, $Q_H(M) \fallingdotseq Q_L(M)$, $Q_H(C) \fallingdotseq Q_L(C)$, $Q_H(K) \fallingdotseq Q_L(K)$ namely, $Q_H(Y, M, C \text{ and } K) \fallingdotseq Q_L(Y, M, C \text{ and } K)$ Even when there is a difference between amount of electrostatic charges $Q_H$ and that of electrostatic charges $Q_L$ for each color, the difference in an amount of electrostatic charges needs to be within 25%. When the difference in an amount of electrostatic charges exceeds 25%, a difference in developing properties or in transfer properties turns out to be remarkable, and color reproduction is worsened.

By using dark colored toner and light colored toner both satisfying the aforesaid conditions for each color, it is possible to obtain quality images wherein transfer properties and development properties are consistent, sharpness is excellent on a high density part, and continuous gradation is obtained on a highlight portion both for a toner image formed for each color, and reproduction properties are excellent even on a color image formed through superposing.

(2) With respect to a monochromatic image forming apparatus, let it be assumed that there holds the following expression representing relationship between weight average particle size $\phi_H$ of dark colored toner and weight average particle size $\phi_L$ of light colored toner both conducting development by using dark colored toner and light colored toner.

$\phi_H \fallingdotseq \phi_L$

Even when there is a difference between the weight average particle size $\phi_H$ and the weight average particle size $\phi_L$, the weight average particle size needs to be within 25%.

Transfer properties and the development properties vary depending on the weight average particle size. FIG. 10 is a graph showing transfer properties, and it shows that the transfer ratio varies depending on whether the weight average particle size is great or small under the same transfer bias voltage. Further, FIG. 11 is a graph showing development properties, and it shows that the development efficiency varies depending on whether the weight average particle size is great or small under the same potential contrast (difference between latent image voltage and developing bias).

For making the transfer properties and the development properties to agree between dark colored toner and light colored toner, a difference of a particle size between a weight average particle size for dark colored toner and that for light colored toner needs to be the weight average particle size which is within 25% and is mostly the same. When the difference of a particle size exceeds 25%, a difference in transfer ratio and that in development efficiency come to be recognized on an image. Appropriate weight average particle sizes $\phi_H$ and $\phi_L$ are within 5–10 $\mu$m.

With regard to a color image forming apparatus to develop by using dark colored toner and light colored toner for each color, the following expression holds between weight average particle size $\phi_H(Y)$, $\phi_H(M)$, $\phi_H(C)$ and $\phi_H(K)$ for each color and weight average particle size $\phi_L(Y)$ $\phi_L(M)$, $\phi_L(C)$ and $\phi_L(K)$ for each color.

$\phi_H(Y, M, C \text{ and } K) \fallingdotseq \phi_L(Y, M, C \text{ and } K)$

Even when there is a difference between weight average particle size $\phi_H$ and weight average particle size $\phi_L$ for each color, the difference of particle size needs to be within 25%. When the difference of particle size exceeds 25%, a difference in developing properties or in transfer properties turns out to be remarkable, and color reproduction is worsened.

By using dark colored toner and light colored toner both satisfying the aforesaid conditions for each color, it is possible to obtain quality images wherein transfer properties and development properties are consistent, sharpness is excellent on a high density part, and continuous gradation is obtained on a highlight portion both for a toner image formed for each color, and reproduction properties are excellent even on a color image formed through superposing.

(3) With regard to a color image forming apparatus to develop by using dark colored toner and light colored toner for each color, the following expressions hold between amount of electrostatic charges $Q_H$ (Y, M, C and K) and weight average particle size $\phi_H$ (Y, M, C and K) for dark colored toner for each color and amount of electrostatic charges $Q_L$ (Y, M, C and K) and weight average particle size $\phi_H$ (Y, M, C and K) for light colored toner for each color.

$Q_H$ (Y, M, C and K)≑$Q_L$ (Y, M, C and K)

$\phi_H$ (Y, M, C and K)≑$\phi_L$ (Y, M, C and K)

Even when there is a difference between amount of electrostatic charges $Q_H$ and amount of electrostatic charges $Q_L$ and between weight average particle size $\phi_H$ and weight average particle size $\phi_L$, the difference needs to be within 25% in both cases.

When an amount of electrostatic charges for dark colored toner is mostly the same as that for light colored toner for each color, and when a weight average particle size for dark colored toner is mostly the same as that for light colored toner for each color, transfer properties and development properties for dark colored toner are exactly the same as those for light colored toner, and gradation and reproduction properties are excellent on a color image formed through superposing, thus, quality images are obtained.

(4) Toner adhesion amount $W_H$ for dark colored toner sticking to a latent image portion and toner adhesion amount $W_L$ for light colored toner sticking to a latent image portion, both for developing by using dark colored toner and light colored toner, are to be in the relationship of the following expression.

$W_H$≑$W_L$

Even when there is a difference between adhesion amount $W_H$ and adhesion amount $W_L$, the difference of adhesion amount needs to be within 25%. When the difference of adhesion amount exceeds 25%, an influence of the difference comes to be recognized on transferred images, and color reproduction is worsened.

By using dark colored toner and light colored toner both satisfying the aforesaid conditions for each color, it is possible to obtain quality images wherein sharpness is excellent on a high density part, and continuous gradation is obtained on a highlight portion both for a toner image formed for each color, and reproduction properties are excellent even on a color image formed through superposing.

(5) When forming a toner image by developing, by the use of dark colored toner, a latent image formed on an image forming body and by developing, by the use of light colored toner, a latent image formed on an image forming body, repeatedly, it is necessary to conduct single-component development or two-component development for both dark colored toner and light colored toner, when developing by the use of dark colored toner and light colored toner each having an amount of electrostatic charges (Q/M) and weight average particle size which are mostly the same for both dark colored toner and light colored toner.

In the case of single-component development, an amount of electrostatic charges is small because no frictional electrification is caused in stirring with carrier in the course of development. In the case of two-component development, an amount of electrostatic charges for toner is 15–30 $\mu c/g$ and weight average particle size is 5–10 $\mu m$.

However, in the case of single-component development, an amount of electrostatic charges for toner is 7–15 $\mu c/g$ and weight average particle size is 5–10 $\mu m$, which represent general physical properties of toner. Therefore, it is not preferable to conduct single-component development and two-component development together, when developing a latent image by using dark colored toner and light colored toner.

Even in the case of development by the use of dark colored toner and light colored toner, toner images are superposed on an image forming body. Therefore, it is necessary that development by the use of light colored toner in the latter step is non-contact development. When using toner wherein an amount of electrostatic charges for toner and weight average particle size are consistent, it is preferable that development by dark colored toner in the former step is also non-contact development as in the latter step. However, for making the high density part to be sharp without an edge effect, it may also be possible to employ contact development wherein it is possible to develop even in the case of low potential contrast.

For obtaining sufficient effect of the invention by using dark colored toner and light colored toner having characteristics in (1)–(5), it is preferable that the light colored toner and the dark colored toner are in the relationship between toner adhesion amount and print image density shown, for example, in FIG. 12. Incidentally, a difference of density between dark colored toner and light colored toner is caused by a difference of amount of pigment contained in toner particles. Further, a toner adhesion amount in the course of saturation depends on a toner particle size and an amount of electrostatic charges. For example, with regard to dark colored toner, recording density is saturated when a toner adhesion amount on a white sheet arrives at the level of about 1 mg/cm². Saturation density value $D_{max}$ (H) under the state of saturation needs to be 1.7–2.5. As shown in FIG. 12, a density value under the state which is almost in saturation is defined as $D_{max}$ (H). Precisely speaking, the density increases gradually as shown with a dotted line.

On the other hand, with regard to light colored toner, density is not saturated even when a toner adhesion amount, for example, on a white sheet arrives at the level of 1 mg/cm². A toner adhesion amount that is the same as that with which the dark colored toner arrives at a saturation density value is attained for light colored toner, namely, recording density D(L) of light colored toner in the case of density saturation of dark colored toner needs to be between 0.3 and 0.8. A ratio of recording density $D_S(L)$ under the use of light colored toner to recording density $D_S(H)$ under the use of dark colored toner, both before the toner adhesion amount on a white sheet arrives at the saturation density value, for example, in the case where the toner adhesion amount is 0.5 mg/cm², namely, recording density inclination ratio Ds between light colored toner and dark colored toner $D_S(L)/D_S(H)$ needs to be within a range of 0.2–0.5.

Next, there will be explained a method of producing developing agents having the aforesaid characteristics which are used for an image forming apparatus in the invention.

Dark colored toner and light colored toner both in color are represented by spherical toner having a weight average particle size of 3–10 $\mu m$, and polymerized toner made through an emulsion polymerization coalescence method. In the method of production of polymerized toner through the emulsion polymerization coalescence method, coloring agents are dispersed in water first by the use of surface active agents. On the other hand, surface active agents, emulsion polymerization starting agents, styrene monomer and acrylic monomer are added in water, and resin emulsion is generated by emulsion polymerization. Next, the aforesaid coloring-agent-dispersed solution and resin emulsion are mixed, then, repulsion force on the surface of a particle generated by pH adjustment is balanced with coagulation force generated by addition of electrolyte for slow coagulation, and fusion and form control for fine particles are conducted by association and heating and stirring simultaneously while controlling particle sizes and grain size distribution. With regard to the stirring in this case, fusion and form control for fine particles are conducted by heating and stirring by the use of an agitation tank which is designed to allow agitation in the state of layer flow without disturbed flow, and the particles thus obtained are subjected to filtration, cleaning and drying, thus, spherical toner having desired particle size with weight average particle size of 3–10 $\mu$m can be obtained.

In the toner obtained in the aforesaid method through the emulsion polymerization coalescence method, grain size distribution is sharp and fine power is less, carrier contamination caused by toner which is the so-called toner spent is less, durability of developing agents is improved, distribution of an amount of electrostatic charges is uniform, and it is possible to obtain images with higher image quality compared with conventional crushing type toner.

A spherical ferrite particle having an average particle size of 40 $\mu$m provided thereon with a 0.5 $\mu$m-thick styrene resin cover layer is used as a carrier, then, the carrier is mixed with toner that is 5–10% by mass of the carrier, and hydrophobic silica in 0.5% by mass is added to produce developing agents.

(2) Owing to the invention, it has become possible to obtain color images which have gradation and are excellent in reproducibility. In a color image forming apparatus which will be explained next, transparent (T) toner and white (S) toner are further used in the color image forming apparatus explained previously, then, a white toner layer and a transparent toner layer are provided between the surface of a transfer material and a color toner image, thus, an influence on image quality caused by the state of the surface of a transfer material is removed by providing the white toner layer, and color images with high image quality and clear hue can be obtained by providing the transparent toner layer under a color toner image.

FIG. 13 is a sectional structure diagram showing an embodiment of the color image forming apparatus stated above. Process unit 100TS is provided newly at the upstream side of process units 100Y, 100M, 100C and 100K for four colors arranged in parallel to face transfer belt 14a of the color image forming apparatus shown in FIG. 2. In the process unit 100TS, developing unit 13(T) employing transparent (T) toner and developing unit 13(S) employing white (S) toner are provided on the circumferential portion of photoreceptor drum 10, and a latent image formed on photoreceptor drum 10 through exposure optical system 12(TS) is first subjected to development with transparent toner by developing unit 13(T) and then is subjected to development with white toner by developing unit 13(S).

In the color image forming apparatus having the aforesaid structure, there is transferred and formed a color toner image wherein a white toner image is formed by a transfer process on the lowermost layer on recording sheet P, then, a transparent toner image is formed on the white toner image, and dark colored toner and light colored toner are used on the transparent toner image. Though a range to which white toner and transparent toner stick is a latent image forming range that is subjected to image-wise exposure by exposure optical system 12(TS), there is a mode to expose a range of images formed by superposing portions subjected to image-wise exposure by either one of exposure optical systems 12 for Y, M, C and K to light by exposure optical system 12(TS) as shown in FIG. 14(a), and a mode to expose a range of formation for white toner images and transparent toner images both set by the use of an editor in advance as shown in FIG. 14(b).

In any of both modes, exposure optical system 12(TS) conducts image-wise exposure whose intensity is set in advance to be uniform, so that a thickness of a white toner adhesion portion and that of a transparent toner adhesion portion may be the same. In this case, it is preferable that white toner approximates to transparent toner on a basis of physical properties, and in relationship between weight average particle size $\phi_S$ as well as amount of electrostatic charges $q_S$ of white toner and weight average particle size $\phi_T$ as well as amount of electrostatic charges $q_T$ of transparent toner, when an amount of electrostatic charges of toner is looked, the following expression is to hold, and a difference between mutual amounts of electrostatic charges is to be within 25%, if any.

$Q_H$ (Y, M, C, K)≒$Q_L$ (Y, M, C, K)

$q_T$≒$q_S$

When an average particle size is looked, the following expression is to hold, $Q_H$ (Y, M, C, K)≒$Q_L$ (Y, M, C, K)

$q_T$≒$q_S$ and a difference between mutual weight average particle sizes is to be within 25%, if any.

$\phi_H$ (Y, M, C, K)≒$\phi_L$ (Y, M, C, K)

$\phi_T$≒$\phi_S$

When the physical properties mentioned above are satisfied by toner, light is reflected on the surface of matted white toner, and light transmitted through a transparent toner layer and through a color image thereon is added to light reflected directly on the color image to be observed, thus, images with high image quality having clear hue can be obtained.

Structures (1)–(3) make it possible to maintain continuity of image quality covering from a low density part to a high density part, and to provide an image forming apparatus that is excellent in sharpness and transferability of images.

Structures (4)–(6) make it possible to maintain continuity of image quality covering from a low density part to a high density part for each of Y, M, C and K, and to provide a color image forming apparatus that forms a color image that is excellent in sharpness, transferability and color balance.

In addition to effects exhibited by Structures (4)–(6), it has become possible to obtain color images having clear hue in Structures (7)–(9).

(3) The invention provides, in all respects, an image forming apparatus that forms an excellent image wherein a reproduction area is broadened and gradation is excellent, by developing by the use of light colored toner and dark colored toner, and a preferable embodiment of a small-sized color image forming apparatus that forms a color image by using light colored toner and dark colored toner will be explained first, referring to the sectional structure diagram in FIG. 15. The explanation will be given below, focusing on points which are different from those of the image forming apparatus shown in FIG. 1.

Since 4 sets of process units 100 are of the common structure, one set of them will be explained. Photoreceptor drum 10 representing an image forming body is one wherein a photoconductor layer of light-transmitting conductive layer and an organic photosensitive layer (OPC) is formed on an outer circumferential surface of a cylindrical base body formed by a light-transmitting member such as glass or light-transmitting acrylic resin.

Photoreceptor drum 10 is rotated counterclockwise as shown with an arrow, by power from an unillustrated driving source, or by transfer belt 14*a*, with its light-transmitting conductive layer grounded.

Each of 11A and 11B is a scorotron charging unit representing a charging means, and it is mounted in the vicinity of photoreceptor drum 10 to face it in the direction perpendicular to the moving direction of the photoreceptor drum 10, to give uniform potential to the photoreceptor drum 10 through corona discharge having the same polarity as that in toner.

Each of exposure optical systems 12(L) and 12(H) is structured as an exposure unit wherein linear exposure element (not shown) in which plural LEDs (light-emitting diode) representing a light-emitting element for image-wise exposure are arranged to be in parallel with an axis of photoreceptor drum 10 and SELFOC lens (not shown) representing a life-size image forming element are attached on a holder. Exposure optical systems 12(L) and 12(H) are attached on a cylindrical holding member which is then housed inside the base body of photoreceptor drum 10. In addition to the foregoing, there is used a linear one wherein plural light-emitting elements such as FL (phosphor luminescence), EL (electro-luminescence) and PL (plasma discharge) are arranged in an array shape, as an exposure element. The exposure optical systems 12(L) is an image-wise exposure means which conducts image-wise exposure based on image data for light colored toner, while, the exposure optical systems 12(H) is an image-wise exposure means which conducts image-wise exposure based on image data for dark colored toner.

The exposure optical systems 12(L) representing an image-wise exposure means for light colored toner is arranged inside photoreceptor drum 10 under the condition that the exposure position on the photoreceptor drum 10 is located between scorotron charging unit 11A and developing unit 13(L) storing therein light colored toner, and is located at the upstream side of the developing unit 13(L) in the direction of rotation of photoreceptor drum 10. The exposure optical systems 12(H) representing an image-wise exposure means for dark colored toner is arranged inside the photoreceptor drum under the condition that the exposure position on the photoreceptor drum 10 is at the downstream side of developing unit 13(H) to be between scorotron charging unit 11B and developing unit 13(H) storing therein dark colored toner, and is located at the upstream side of the developing unit 13(H) in the direction of rotation of photoreceptor drum 10.

Developing unit 13(L) is a developing unit which stores one-component light colored toner or two-component developing agents containing light colored toner and magnetic carrier, and conducts reversal development on a contact basis or a non-contact basis. Developing unit 13(H) is a developing unit which stores one-component dark colored toner which makes it possible to conduct superposing development without damaging toner images or storing two-component developing agents containing dark colored toner and magnetic carrier, and conducts soft development or, preferably, reversal development on a non-contact developing basis.

In the case of image forming, image data for each of Y, M, C and K are divided into image data for light colored toner and image data for dark colored toner which will be explained in detail, and image data for light colored toner are subjected to image-wise exposure by exposure optical system 12(L) and are subjected to development with light colored toner carried out by developing unit 13(L). Image data for dark colored toner are subjected to image-wise exposure by exposure optical system 12(H) and are subjected to development with dark colored toner carried out by developing unit 13(H), thus, a toner image of dark colored toner is superposed on a toner image of light colored toner on photoreceptor drum 10. This toner image is transferred onto transfer belt 14*a* which will be explained later, at a transfer position. Toner remaining on the drum after transfer is removed by cleaning unit 19 that collects toner electrostatically.

When image recording is started, an unillustrated photoreceptor driving motor starts rotating photoreceptor drum 10 of process unit 100 for black (K) in the direction shown with an arrow, and simultaneously with this, scorotron charging unit 11A for K starts giving potential to photoreceptor drum 10 for K through charging operations.

After photoreceptor drum 10 for K is given potential, exposure optical system 12(L) for light colored toner for K starts image writing on the photoreceptor drum 10 for K with electric signals corresponding to the first color signals, namely to image data for light colored toner for K, and thereby, a latent image for light colored toner corresponding to images for K in document images is formed on photoreceptor drum 10 for K.

The latent image for light colored toner mentioned above is subjected to reversal development on a contact basis conducted by developing unit 13(L) for light colored toner for K, and thereby, a toner image for light colored toner for K is formed in accordance with rotation of photoreceptor drum 10 for K. Then, there is formed an electrostatic latent image for dark colored toner corresponding to the image for K formed by charging conducted by scorotron charging unit 11B and by exposure optical system 12(H) for dark colored toner for K, and it is superposed on a toner image for light colored toner for K under which a toner image by dark colored toner for K is formed by developing unit 13(H) for dark colored toner.

The toner image for K composed of light colored toner and dark colored toner formed, by the image forming process stated above, on photoreceptor drum 10 for K repress an image forming body is transferred onto transfer belt 14*a* by primary transfer unit 14*c* representing the first transfer means at a transfer area for K (having no symbol).

Then, the transfer belt 14*a* is synchronized with the toner image for C, and the toner image composed of light colored toner and dark colored toner for C formed on photoreceptor drum 10 for C by process unit 100 for cyan (C) is superposed on the toner image composed of light colored toner and dark colored toner stated above by primary transfer unit 14*c* for C representing the first transfer means at a transfer area (having no symbol) for C.

In the present embodiment, there is employed a process wherein dark colored toner is stuck on light colored toner which has been stuck on photoreceptor drum 10, and this sequence of development produces the following effects.

(1) Dark color toner which is easily highlighted can be transferred satisfactorily.

(2) Even when light colored toner which has been stuck through image-wise exposure previously, it is inconspicuous.

(3) Even when color mixing of light colored toner is caused in developing unit 13(H) located at the downstream side, its influence is less.

In the present embodiment, development is conducted by using both light colored toner and dark colored toner for each of 4 colors of Y, M, C and K. However, an excellent effect of the invention can also be obtained even in the arrangement wherein only dark colored toner is used for each of Y, M and C for development, and light colored toner and dark colored toner are used only for K for development. In this case, five sets of developing units are provided in an image forming apparatus.

In the present embodiment, image density data for each color of Y, M, C and K is divided into image density data for light colored toner and image density data for dark colored toner, and the image density data for light colored toner are subjected to image-wise exposure on exposure optical system 12(L) for light colored toner, while, the image density data for dark colored toner are subjected to image-wise exposure on exposure optical system 12(H) for dark colored toner.

FIG. 16 shows a block diagram of an image processing system in the present embodiment. Images on a document are read by an image reading means employing a solid-state image pick-up element such as CCD (F1). Analog image signals outputted from CCD and amplified are A/D-converted into digital signals of 8–10 bits, and shading correction and image processing (1) succeeding the shading correction and including color space conversion, logarithmic conversion, black generation and color correction, are conducted (F2). Incidentally, with regard to image data, they may also be read from a memory storing the image data to be processed in the same way.

Image data obtained through image processing (1) are subjected to image judgment to judge, by checking density distribution of data and density difference between adjoining dots, whether the document image is a normal contrast image such as a photograph or a picture or a character image such as a character or a line graphic (F3).

With regard to the image data obtained through image processing (1), image data for light colored toner (F5A) and image data for dark colored toner (F5B) are prepared based on the results of judgment whether the image is a normal contrast image or a character image. Each of FIGS. 17(*a*) and 17(*b*) is an illustration showing how the image data are separated to image data for light colored toner and image data for dark colored toner, in which, FIG. 17(*a*) shows image data for light colored toner and dark colored toner for a normal contrast image, while, 17(*b*) shows image data for light colored toner and dark colored toner for a character image. Both of them show how the ratio of composition of the image data for light colored toner and dark colored toner is changed depending on whether the image data are represented by a normal contrast image or by a character image. Namely, image data for using more light colored toner are prepared for a normal contrast image, and image data for using more dark colored toner are prepared for a character image.

For the separated image data for light colored toner and dark colored toner, γ correction is conducted for each toner (F6A, F6B), and MTF correction (F7A, F7B) and PWM modulation (F8A, F8B) are conducted. For PWM modulation, it is preferable to form with a large dot for improving dot reproduction at a highlight portion (low density portion), and to make a recording unit to be great. For example, for image data for light colored toner, 2-pixel PWM is conducted to enhance gradation and to make a recording unit to be great. On the other hand, 1-pixel PWM is conducted for image data for dark colored toner because great importance is attached to resolving power is. Incidentally, intensity modulation may also be used in place of PWM modulation.

Image data for light colored toner on which PWM modulation has been finished are subjected to image-wise exposure conducted by exposure optical system 12(L) on photoreceptor drum 10(F9A), and image data for dark colored toner on which PWM modulation has been finished are subjected to image-wise exposure conducted by exposure optical system 12(H) on photoreceptor drum 10(F9B).

Incidentally, it is preferable that these correction values are changed one after another in accordance with image judgment. Namely, γ correction is set to be low, MTF correction is made to be faint and a PWM recording unit is made to be great for a normal contrast image. On the other hand, γ correction is set to be rather low, MTF correction is made to be rather faint and a PWM recording unit is made to be great for a normal contrast image. On the other hand, γ correction is set to be rather high, MTF correction is made to be intense and a PWM recording unit is made to be small for a character image.

FIG. 18 is a graph showing an amount of toner adhering on photoreceptor drum 10 when light colored toner and dark colored toner are used in the present embodiment. (1) For the high density portion, dark colored toner only is used by image data for dark colored toner, and a toner adhesion amount is reduced while reproducibility is maintained. (2) For the low density portion, a size of a recording dot for image data for light colored toner is made to be great so that light colored toner only is used, and thereby, sufficient toner adhesion amount is maintained, and stable reproducibility is kept. (3) For the intermediate portion between the high density portion and the low density portion, light colored toner and dark colored toner are used together by image data for light colored toner and that for dark colored toner, and thereby, gradation is maintained and image unevenness is prevented.

Each of FIGS. 19(*a*)–19(*c*) is an illustration showing the state of adhesion of toner at low density portion—high density portion. In the invention, a difference of toner adhesion amount between the high density portion and the low density portion is less as shown in FIG. 18, which eliminates troubles for transfer and fixing.

In the image forming apparatus employing light colored toner and dark colored toner which has been explained above, for obtaining sufficient effect of the invention, it is preferable that the light colored toner and the dark colored toner are in the relationship between toner adhesion amount and print image density shown, for example, in FIG. 12. Incidentally, a difference of density between light colored toner and dark colored toner is caused by a difference of amount of pigment contained in toner particles. Further, a toner adhesion amount in the course of saturation depends on a toner particle size. For example, with regard to dark colored toner, recording density is saturated when a toner adhesion amount on a white sheet arrives at the level of about 1 mg/cm$^2$. Saturation density value $D_{max}$(H) under the state of saturation needs to be 1.7–2.5. As shown in FIG. 12, a density value under the state which is almost in saturation is defined as $D_{max}$ (H). Precisely speaking, the density increases gradually as shown with a dotted line.

On the other hand, with regard to light colored toner, density is not saturated even when a toner adhesion amount, for example, on a white sheet arrives at the level of 1 mg/cm$^2$. A toner adhesion amount that is the same as that with which the dark colored toner arrives at a saturation density value is attained for light colored toner, namely, recording density D(L) of light colored toner in the case of density saturation of dark colored toner needs to be between 0.3 and 0.8. A ratio of recording density $D_S$ (L) under the use of light colored toner to recording density $D_S$ (H) under the use of dark colored toner, both before the toner adhesion amount on a white sheet arrives at the saturation density value, for example, in the case where the toner adhesion amount is 0.5 mg/cm$^2$, namely, recording density inclination ratio Ds between light colored toner and dark colored toner $D_S$ (L)/$D_S$ (H) needs to be within a range of 0.2–0.5.

With respect to recording density, it is necessary that the aforesaid relationship exists between dark colored toner and light colored toner, and it is preferable that light colored toner and dark colored toner are in the same condition as far as a toner particle size and an amount of electrostatic charges are concerned. With respect to a toner particle size, it is preferable, from the viewpoint of securing image quality and developability for light colored toner and dark colored toner, that a volume average particle size is within 3–10 µm, and a difference is not more than ±20%, if any. With regard to an amount of electrostatic charges, it is preferable that it is within 5–30 µC/g for light colored toner and dark colored toner, and a large amount of electrostatic charges is necessary when a toner particle size is small in particular, and a difference is not more than ±20%, if any. By satisfying these conditions, same γ characteristics are obtained between light colored toner and dark colored toner, and it is easy to design so that the sum of adhesion amount for light colored toner and dark colored toner at medium density portion—high density portion is mostly the same, and recording density may change linearly.

Incidentally, gradation characteristics shown in FIG. 12 vary depending on a toner particle size and on color materials contained. In the case of small-sized particle toner, saturation is caused even when an adhesion amount is more less to be 0.5 mg/cm$^2$, and saturation density and a gradient ratio are important for design of light colored toner and dark colored toner.

(4) There have been explained light colored toner and dark colored toner. A small-sized image forming apparatus wherein a reproduction area is broadened by using the light colored toner and dark colored toner mentioned above and color superposing is conducted easily has been explained with reference to FIG. 15. What is shown in FIG. 20 is also a sectional structure diagram of an image forming apparatus exhibiting the same effects. As far as the point that process units 100 which form toner images for Y, M, C and K by using light colored toner and dark colored toner are arranged in parallel is concerned, the color image forming apparatus stated above is exactly the same as what is shown in FIG. 15. In the present embodiment, however, toner images are superposed on a transfer material without intervention of an intermediate transfer body. With regard to only points different from those shown in FIG. 15, recording sheet P ejected out of sheet feed cassette 15 is conveyed, for image forming, to conveyance belt 14 through timing roller 16, in synchronization with toner image forming on process unit 100.

The recording sheet P thus conveyed is charged by sheet charging unit 14m to be in the same polarity as toner, and it comes in close contact with rotating conveyance belt 14 to be conveyed thereby, during which a toner image that is formed on process unit 100Y and is composed of dark colored toner and light colored toner both for Y is transferred by primary transfer unit 14c onto the recording sheet P, and on the toner image thus transferred, there are superposed toner images for M, C and K each being composed of dark colored toner and light colored toner formed respectively on process unit 100M, process unit 100C and process unit 100K to be transferred, thus, a color toner image is formed.

The recording sheet P carrying a color toner image is neutralized by separation electrode 14n, then is separated from conveyance belt 14 to be conveyed to fixing unit 17 where the color toner image on the recording sheet P is fixed, and the recording sheet P is ejected to a tray located outside the apparatus.

Even in the embodiment shown in FIG. 20, it is possible to employ either an arrangement wherein dark colored toner only is used in development for Y, M and C, and dark colored toner and light colored toner are used in development only for K, or an arrangement wherein dark colored toner only is used in development for Y, and dark colored toner and light colored toner are used in development for K, C and M, and excellent effects of the invention can be exhibited in both cases.

It is further possible to apply the invention to a monochromatic image forming apparatus for a single color of K.

In every image forming apparatus of the invention, both light colored toner and dark colored toner are used, and effects to broaden a reproduction area and to enhance gradation for the image formed are exhibited. In Structure (10), gradation on a highlight portion and transfer properties are improved, in particular by using image density data in a combination use as image data for light colored toner and dark colored toner. In Structure (11), the most preferable relationship of density between light colored toner and dark colored toner is obtained, and an effect of the invention is further enhanced. In Structure (12), a small-sized image forming apparatus wherein color matching can be conducted easily can be provided. In Structures (13) and (14), an image forming apparatus wherein scattering of dark colored toner in transferring is reduced and image quality is improved can be provided.

(5) As shown in each of sectional structure diagrams of FIGS. 21 and 22, the present embodiment is represented by an image forming apparatus wherein a light colored toner image and a dark colored toner image are made respectively on two image forming bodies through charging, image-wise exposure and development, and the light colored toner image and the dark colored toner image are superposed. In particular, it is a color image forming apparatus wherein a color image is formed by superposing a color image of light colored toner and a color image of dark colored toner each being formed by superposing colors of Y, M, C and K in a tandem method, and it is of the structure which is small in size and is suitable for forming an image composed only of dark colored toner.

What is shown in FIG. 21 is an image forming apparatus wherein a light colored toner image and a dark colored toner image are superposed on an intermediate transfer body and then, are transferred onto a recording sheet. What is shown in FIG. 22 is an image forming apparatus wherein a color image composed of light colored toner and a color image composed of dark colored toner both formed on an image forming body are superposed on a recording sheet. Members each having a function which is the same as that of each member explained already in FIG. 15 or FIG. 20 are given the same symbols.

In a color image forming apparatus shown in FIG. 21, process unit 100L forming color images by using light colored toner and process unit 100H forming color images by using dark colored toner are arranged on a peripheral portion of transfer belt 14a to be in series. Since the process unit 100L and the process unit 100H are the same in terms of structure, the process unit 100L only will be explained. Along the circumferential surface of photoreceptor drum 10, there are provided, in the order of four colors of Y, M, C and K from the upstream side in the direction of rotation of the photoreceptor drum 10, four sets each including scorotron charging unit 11 representing a charging means, exposure optical system 12(L) and developing unit 13(L). On the photoreceptor drum 10 whose circumferential surface has been cleaned by cleaning unit 19 and charged uniformly by scorotron charging unit 11Y, there is formed an electrostatic latent image for Y and for light colored toner by exposure optical system 12(L) Y based on image data for Y and for light colored toner.

On Y toner image composed of light colored toner, there is formed and superposed M toner image composed of light colored toner by scorotron charging unit 11M, exposure optical system 12(L) M and developing unit 13(L) M. Further, on the Y toner image and the M toner image both composed of light colored toner, there is formed and superposed C toner image composed of light colored toner by scorotron charging unit 11C, exposure optical system 12(L) C and developing unit 13(L) C, and on the C toner image, there is formed and superposed K toner image composed of light colored toner by scorotron charging unit 11K, exposure optical system 12(L) K and developing unit 13(L) K.

In the process unit 100H, color toner images respectively for four colors of Y, M, C and K are formed and superposed in the same way as in the foregoing by scorotron charging units 11. exposure optical systems 12(H) conducting image-wise exposure by image data for dark colored toner and developing units 13(H) storing dark colored toner, all provided along the circumferential surface of photoreceptor drum 10 and are for four colors of Y, M, C and K.

The color toner image composed of light colored toner formed on process unit 100L is transferred onto transfer belt 14a by primary transfer unit 14c, and a color toner image composed of dark colored toner formed on process unit 100H is transferred to be superposed on the color toner image composed of light colored toner transferred onto the transfer belt 14a. The color toner images composed respectively of light colored toner and dark colored toner which have been transferred onto the transfer belt 14a to be superposed are collectively transferred onto recording sheet P that is fed through timing roller 16 by secondary transfer unit 14g and then, is fixed by fixing unit 17 after being neutralized by neutralizing electrode 16b, to be ejected out of the apparatus.

FIG. 22 shows another embodiment wherein process unit 100H that forms a color toner image composed of dark colored toner and process unit 100L that forms a color toner image composed of light colored toner are arranged in series to face transfer belt 14, in the same way as in FIG. 21. For image forming, recording sheet P ejected out of a sheet feed cassette in synchronization with forming of a toner image composed of dark colored toner on the process unit 100H is conveyed to transfer belt 14 through timing roller 16. The recording sheet P is brought into close contact with transfer belt 14 by sheet charging unit 14m to be conveyed, and a color toner image composed of dark colored toner formed on the process unit 100H is transferred onto the recording sheet P by primary transfer unit 14c, then, a color toner image composed of light colored toner formed on the process unit 100L is transferred to be superposed simultaneously on the transferred color toner image composed of dark colored toner.

The recording sheet P carrying color toner images composed respectively of light colored toner and dark colored toner is neutralized by separation electrode 14n to be separated from conveyance belt 14 and is conveyed to fixing unit 17 to be fixed, and then, to be ejected out of the apparatus.

In the image forming apparatus shown in each of FIGS. 21 and 22, it is possible to obtain images with continuous gradation and high image quality by using process units 100L and 100H, and it is possible to use light colored toner and dark colored toner easily so that they may conform to the image itself or a purpose of usage, including forming of images composed only of dark colored toner by using process unit 100H independently.

In the present embodiment, a means to decompose image density data into image data for light colored toner and image data for dark colored toner changes image data which change a rate of usage for light colored toner and dark colored toner, and a means to decompose image density data into image data for light colored toner and image data for dark colored toner by using light colored toner having glossiness higher than that of dark colored toner changes image data which change glossiness of outputted images, in an image forming apparatus that is shown in each of FIGS. 15, 20, 21 and 22 and employs light colored toner and dark colored toner.

Namely, in a block diagram of an image processing system shown in FIG. 16 stated above, an output form (F3) is selected to either one of (1) change of image data using only dark colored toner, (2) change of image data changing the rate of usage for light colored toner and dark colored toner and (3) change of image data using only light colored toner.

In the present embodiment, either one of (1)–(3) is selected in accordance with an output form such as whether an outputted image is a business document, or it is an image with high image quality such as a photograph, or it is an image for OHP, or a presentation area for images is broadened by the specified output form. Each of FIGS. 23(a), 23(b) and 23(c) shows separated image data.

(Change of Image Data Using Only Dark Colored Toner Shown in FIG. 23(a))

This is used as one for a business document. Reproducibility on the low density part is not good because no light colored toner is used, but reproducibility on the matt and high density part on a character is excellent. Compared with an amount of used toner shown in each of FIGS. 23(b) and 23(c), an amount of used toner is least. When image compression is conducted through binary-coding, an amount of memory can be less. Therefore, it is suitable as image data change for printers.

(Change of Image Data Changing the Rate of Usage for Light Colored Toner and Dark Colored Toner Shown in FIG. 23(b))

This realizes improvement of reproducibility for low density up to high density, by using light colored toner and dark colored toner. It is possible to realize uniformity of a surface gloss by increasing an amount of used light colored toner (FIG. 23(b)). In particular, when low melting point toner is used as light colored toner, glossiness can be improved.

(Change of Image Data Using Only Light Colored Toner Shown in FIG. 23(c))

This is used as one for OHP and photographic images. In this case, a saturation density value is not high because no dark colored toner is used. However, it is possible to obtain clear projected images by using light colored toner only as developing agents for OHP, because light-transmittance of light colored toner is high. It is further possible to obtain images wherein great importance is attached to gradation, because image density of a photographic image is low and faint.

In the image forming apparatus that is shown in each of FIGS. 21 and 22 and employs light colored toner and dark colored toner, for example, in the present embodiment, a means to divide image density data into image data for light colored toner and image data for dark colored toner has image data for light colored toner even in the high density part.

In the image forming apparatus stated above, a light colored toner layer is superposed on a dark colored toner layer that is formed on a transfer material. In the image forming apparatus stated above, glossiness of light colored toner is made to be higher than that of dark colored toner, and image data for light colored toner is owned even in the high density part.

As explained already with reference to FIG. 16, with regard to image data obtained through image processing (1), image data for light colored toner (F5A) and image data for dark colored toner (F5B) are prepared based on results of area judgment concerning whether the image is a normal contrast image or a character image or on the specified output form (F3). Each of FIGS. 24(a) and 24(b) is an illustration showing how the image data are divided into image data for light colored toner and image data for dark colored toner. That is, FIG. 24(a) shows image data for light colored toner and that for dark colored toner in the case of a normal contrast image, while FIG. 24(b) shows image data for light colored toner and that for dark colored toner in the case of a character image, which shows that the rate of composition for image data for light colored toner and that for dark colored toner is changed depending on whether the image data are for a normal contrast image or for a character image. Namely, for a normal contrast image, image data for using more light colored toner is prepared, while, for a character image, image data for using more dark colored toner is prepared, in accordance with results of area judgment.

In the present embodiment, with regard to divided image data for light colored toner, they include not only image data for dark colored toner but also image data for light colored toner as shown with a solid line, although they should originally be image data shown with a dotted line, for the high density part, and image data for light colored toner are prepared so that the adhesion ratio of light colored toner on the maximum density part may be within a range of 3–30%. Despite the image for light colored toner having the light toner adhesion ratio in the aforesaid range, the light colored toner can be used for the high density part without affecting density of images to be printed, because image tone of the light colored toner is faint. Incidentally, for the low density part, image data for dark colored toner do not need to be prepared.

Because of presence of light colored toner up to the high density part, continuity of image quality is maintained and a light colored toner image always exists correspondingly on a dark colored toner portion. Therefore, flatness of adhering toner is continuous and excellent transfer properties can be obtained.

Further, uniform gloss on the entire surface of a print image is obtained by setting glossiness to be high through the method to lower the melting point by comparing light colored toner to be used with dark colored toner.

The results stated above were obtained based on many experimental studies made by the inventor of the invention, and with regard to images wherein light colored toner exists on the high density part, there was observed a difference that presence of a light colored toner layer on a dark colored toner layer on a recording sheet representing a transfer material is more excellent in terms of uniform glossiness, an image depth and image continuity on a print image, when it is compared with presence of a dark toner layer on a light colored toner layer.

Structures (15) and (16) make it possible to provide a small-sized image forming apparatus wherein light colored toner and dark colored toner are used in accordance with images and an image forming apparatus wherein an image conforming to the object for a glossy image, a matt image or an OHP can be obtained.

Structures (17), (18) and (19) make it possible to provide an image forming apparatus wherein continuity of image quality for the low density part up to the high density part and continuity of flatness are maintained and transfer properties are excellent.

Structures (20) and (21) make it possible to provide an image forming apparatus that is suitable as a small-sized color printing apparatus and an image forming apparatus wherein a method for using light colored toner and dark colored toner in accordance with images can be selected.

(6) FIG. 26 shows a block diagram of an image processing system in the present embodiment. Images on a document are read by an image reading means employing a solid-state image pick-up element such as CCD (F1). Analog image signals outputted from CCD and amplified are A/D-converted into digital signals of 8–10 bits, and shading correction and image processing (1) succeeding the shading correction and including color space conversion, logarithmic conversion, black generation and color correction, are conducted (F2). Incidentally, with regard to image data, they may also be read from a memory storing the image data to be processed in the same way.

Image data obtained through image processing (1) are subjected to image judgment to judge, by checking density distribution of data and density difference between adjoining dots, whether the document image is a normal contrast image such as a photograph or a picture or a character image such as a character or a line graphic (F3).

With regard to the image data obtained through image processing (1), image data for light colored toner (F5A) and image data for dark colored toner (F5B) are prepared based on the results of judgment or on the specified output form (F3) whether the image is a normal contrast image or a character image.

Divided image data for light colored toner and image data for dark colored toner are subjected to γ correction for each toner (F6A, F6B) and then, are subjected to multi-valued processing (F7A, F7B).

In the invention, the following processing in the multi-valued processing section is conducted. Namely, with regard to images by dark colored toner, stress is laid on formation of images with high resolution and high density, and processing to make a recording cycle small is conducted. With regard to images by light colored toner, stress is laid on formation of images with high gradation, and processing to make a recording cycle large is conduct. By doing these processing operations, there is formed an excellent image wherein both high resolution and high gradation are obtained consistently.

The processing to make the image forming cycle to be large or small stated above is conducted by dither processing or pulse width modulation processing.

FIG. 27 shows an example wherein a dither cycle is changed by using multi-valued dither, and for an image employing dark colored toner, fine halftoning is conducted as 2×2 matrix dither, and processing for making recording cycle small is conducted by combining with multi-valued modulation based on pulse-width modulation, while, for an image employing light colored toner, course halftoning is conducted as 4×4 matrix dither, and processing for making recording cycle large is conducted by combining with multi-valued modulation based on pulse-width modulation.

FIG. 28 shows an example to conduct a change of 1 pixel/2 pixels by using pulse-width modulation, and for an image employing dark colored toner, processing for making recording cycle small is conducted by conducting fine recording as 1 pixel PWM, while, for an image employing light colored toner, processing for making recording cycle large is conducted by making a recording unit to be great as 2 pixels PWM.

Incidentally, in this case, PMW processing is conducted by combining with an error diffusion method, and laser scanning is carried out on a photoreceptor by a laser spot for image-wise exposure whose minor axis is in the scanning direction and a major axis is in the sub-scanning direction.

The image data for light colored toner which has been finished in terms of multi-valued processing makes exposure optical system 12(L) to conduct image-wise exposure on photoreceptor drum 10(F8A), and image data for dark colored toner which has been finished in terms of multi-valued processing makes exposure optical system 12(H to conduct image-wise exposure on photoreceptor drum 10(F8B).

In Structure (22), by setting an image forming cycle for dark colored toner to be shorter than that for light colored toner in processing at a multi-valued processing section in image forming, for image data for dark colored toner and image data for light colored toner, for the similar color, there is formed an excellent image wherein both high resolution and high gradation are obtained consistently. primary transfer unit 14*c* for C representing the first transfer means at the transfer area for C (having no symbol).

What is claimed is:

1. A color image forming apparatus for forming a color image by a plurality of different colored toners, comprising:
    (a) an image-wise exposure means for forming a latent image of an original document on an image carrying body;
    (b) a developing means for developing the latent image, for at least one color from among the different colors, comprising
        a first developing unit containing a dark colored toner, and
        a second developing unit containing a light colored toner which has a similar hue to that of the dark colored toner and a color lighter than the dark colored toner;
    (c) a transfer means for transferring a toner image developed by the developing means onto a recording sheet; and
    (d) a controller for controlling the image-wise exposure means, the developing means and the transfer means to form the color image,
    wherein the controller generates first and second image data for the first and second developing units, independently, on the basis of image data of the original document, and then controls the image-wise exposure means to form latent images on the basis of each image data after gradation correction for each of the first and second image data is independently conducted; and
    wherein a gradient ratio of recording density for the light colored toner and the dark colored toner is in a range of 0.2 to 0.5.

2. The color image forming apparatus of claim 1, wherein when the recording density for the dark colored toner is saturated, the recording density of the light colored toner is in a range of 0.3 to 0.8.

3. A color image forming apparatus for forming a color image by a plurality of different colored toners, comprising:
    (a) an image-wise exposure means for forming a latent image of an original document on an image carrying body;
    (b) a developing means for developing the latent image, for at least one color from among the different colors, comprising
        a first developing unit containing a dark colored toner, and
        a second developing unit containing a light colored toner which has a similar hue to that of the dark colored toner and a color lighter than the dark colored toner;
    (c) a transfer means for transferring a toner image developed by the developing means onto a recording sheet; and
    (d) a controller for controlling the image-wise exposure means, the developing means and the transfer means to form the color image,
    wherein the controller generates first and second image data for the first and second developing units, independently, on the basis of image data of the original document, and then controls the image-wise exposure means to form latent images on the basis of each image data after gradation correction for each of the first and second image data is independently conducted; and
    further comprising a dividing means for dividing image density data of the original document into the image data used for the light colored toner and the image data used for the dark colored toner,
    wherein the dividing means changes the image data which changes a ratio of usage for the light colored toner and the dark colored toner.

4. The color image forming apparatus of claim 3, wherein the dividing means changes the image data that uses only the dark colored toner.

5. The color image forming apparatus of claim 3, wherein the dividing means changes the image data that uses only the light colored toner.

6. The color image forming apparatus of claim 3, wherein the dividing means changes the image data which changes a ratio of usage of the light colored toner and the dark colored toner.

7. A color image forming apparatus for forming a color image by a plurality of different colored toners, comprising:
    (a) an image-wise exposure means for forming a latent image of an original document on an image carrying body;
    (b) a developing means for developing the latent image, for at least one color from among the different colors, comprising
        a first developing unit containing a dark colored toner, and
        a second developing unit containing a light colored toner which has a similar hue to that of the dark colored toner and a color lighter than the dark colored toner;
    (c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and further comprising a dividing means for dividing image density data of the original document into the image data used for the light colored toner and the image data used for the dark colored toner, wherein the dividing means changes the image data which changes glossiness of an outputted image by using the light colored toner whose glossiness is higher than that of the dark colored toner.

8. The color image forming apparatus of claim 7, wherein the dividing means changes the image data that uses only the dark colored toner.

9. The color image forming apparatus of claim 7, wherein the dividing means changes the image data that uses only the light colored toner.

10. The color image forming apparatus of claim 7, wherein the dividing means changes the image data which changes a ratio of usage of the light colored toner and the dark colored toner.

11. A color image forming apparatus for forming a color image by a plurality of different colored toners, comprising:

(a) an image-wise exposure means for forming a latent image of an original document on an image carrying body;

(b) a developing means for developing the latent image, for at least one color from among the different colors, comprising
  a first developing unit containing a dark colored toner, and
  a second developing unit containing a light colored toner which has a similar hue to that of the dark colored toner and a color lighter than the dark colored toner;

(c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and further comprising a dividing means for dividing density data of the original document into the image data used for the light colored toner and the image data used for the dark colored toner, wherein the dividing means has the image data used for the light colored toner in a high density part.

12. The color image forming apparatus of claim 11, wherein a ratio of an adhering amount of the light colored toner in the high density part is in a range of 3 to 30%.

13. A color image forming apparatus for forming a color image by a plurality of different colored toners, comprising (a) an image-wise exposure means for forming a latent image of an original document on an image carrying body;

(b) a developing means for developing the latent image, for at least one color from among the different colors, comprising
  a first developing unit containing a dark colored toner, and
  a second developing unit containing a light colored toner which has a similar hue to that of the dark colored toner and a color lighter than the dark colored toner;

(c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and wherein a difference of an average amount of charges between the dark colored toner and the light colored toner is not more than 25%.

14. A color image forming apparatus for forming a color image by a plurality of different colored toners, comprising:

(a) an image-wise exposure means for forming a latent image of an original document on an image carrying body;

(b) a developing means for developing the latent image, for at least one color from among the different colors, comprising
  a first developing unit containing a dark colored toner, and
  a second developing unit containing a light colored toner which has a similar hue to that of the dark colored toner and a color lighter than the dark colored toner;

(c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and wherein a difference of a toner particle diameter of a weight average particle diameter between the dark colored toner and the light colored toner is not more than 25%.

15. A color image forming apparatus for forming a color image by a plurality of different colored toners, comprising:

(a) an image-wise exposure means for forming a latent image of an original document on an image carrying body;

(b) a developing means for developing the latent image, for at least one color from among the different colors, comprising a first developing unit containing a dark colored toner, and a second developing unit containing a light colored toner which has a similar hue to that of the dark colored toner and a color lighter than the dark colored toner;

(c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and wherein a difference of an amount of toner adhering to a latent image portion having a same potential contrast between the dark toner and the light toner is not more than 25%.

16. A color image forming apparatus for forming a color image by a plurality of different colored toners, comprising:

(a) an image-wise exposure means for forming a latent image of an original document on an image carrying body;

(b) a developing means for developing the latent image, for at least one color from among the different colors, comprising a first developing unit containing a dark colored toner, and a second developing unit containing a light colored toner which has a similar hue to that of the dark colored toner and a color lighter than the dark colored toner;

(c) a transfer means for transferring a toner image developed by the developing means onto a recording sheet; and (d) a controller for controlling the image-wise exposure means, the developing means and the transfer means to form the color image, wherein the controller generates first and second image data for the first and second developing units, independently, on the basis of image data of the original document, and then controls the image-wise exposure means to form latent images on the basis of each image data after gradation correction for each of the first and second image data is independently conducted; and wherein the first developing unit for the dark colored toner and the second developing unit for the light colored toner are provided around the image carrying body, development for superposing the dark colored toner and the light colored toner is conducted, so that the superposed dark colored toner and light colored toner are transferred onto a transfer material, and wherein an image forming cycle for the dark colored toner is smaller than that for the light colored toner.

17. The color image forming apparatus of claim 16, wherein the image forming cycle is formed by a dither processing.

18. The color image forming apparatus of claim 16, wherein the image forming cycle is formed by a pulse width modulation processing.

* * * * *